US011910798B2

(12) United States Patent
Santra et al.

(10) Patent No.: US 11,910,798 B2
(45) Date of Patent: Feb. 27, 2024

(54) COMPOSITIONS INCLUDING A VACANCY-ENGINEERED (VE)-ZNO NANOCOMPOSITE, METHODS OF MAKING THE COMPOSITIONS AND METHODS OF USING THE COMPOSITIONS

(71) Applicant: UNIVERSITY OF CENTRAL FLORIDA RESEARCH FOUNDATION, INC., Orlando, FL (US)

(72) Inventors: Swadeshmukul Santra, Orlando, FL (US); Megan Berroth, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 0 days.

(21) Appl. No.: 18/058,812

(22) Filed: Nov. 25, 2022

(65) Prior Publication Data
US 2023/0180765 A1    Jun. 15, 2023

Related U.S. Application Data

(62) Division of application No. 15/550,615, filed as application No. PCT/US2016/019105 on Feb. 23, 2016, now abandoned.

(60) Provisional application No. 62/119,494, filed on Feb. 23, 2015.

(51) Int. Cl.
| | | |
|---|---|---|
| *A01N 59/16* | (2006.01) | |
| *A01N 25/04* | (2006.01) | |
| *A01N 25/28* | (2006.01) | |
| *A01N 25/34* | (2006.01) | |
| *A01N 31/00* | (2006.01) | |
| *B82Y 30/00* | (2011.01) | |
| *B82Y 40/00* | (2011.01) | |
| *C01G 9/02* | (2006.01) | |

(52) U.S. Cl.
CPC ............. *A01N 59/16* (2013.01); *A01N 25/04* (2013.01); *A01N 25/28* (2013.01); *A01N 25/34* (2013.01); *A01N 31/00* (2013.01); *B82Y 30/00* (2013.01); *B82Y 40/00* (2013.01); *C01G 9/02* (2013.01); *A01N 2300/00* (2013.01)

(58) Field of Classification Search
CPC ................................. A01N 59/16; A01N 25/26
See application file for complete search history.

(56) References Cited

U.S. PATENT DOCUMENTS

| | | | | |
|---|---|---|---|---|
| 5,667,795 | A * | 9/1997 | Fraley ................... | A01N 59/16 424/641 |
| 6,200,080 | B1 * | 3/2001 | Bryan ................... | F16B 5/0258 411/60.2 |
| 2014/0056947 | A1 * | 2/2014 | Adelung .......... | G01N 33/56988 435/174 |

* cited by examiner

*Primary Examiner* — Robert A Wax
*Assistant Examiner* — William Craigo
(74) *Attorney, Agent, or Firm* — Joseph M. Noto; George R. McGuire; Blaine T. Bettinger

(57) ABSTRACT

Embodiments of the present disclosure, in one aspect, relate to compositions including a vacancy-engineered (VE)-ZnO nanocomposite, methods of making a composition, methods of using a composition, and the like.

10 Claims, 18 Drawing Sheets

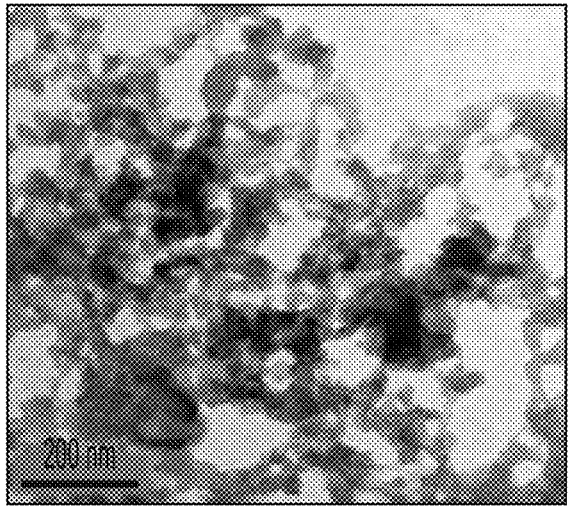 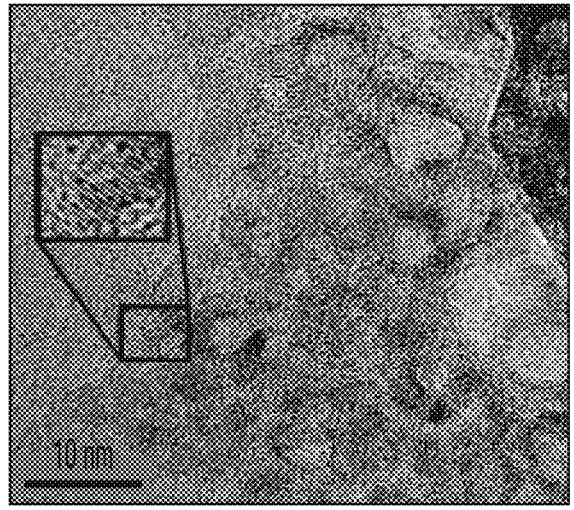
FIG. 2A                    FIG. 2B
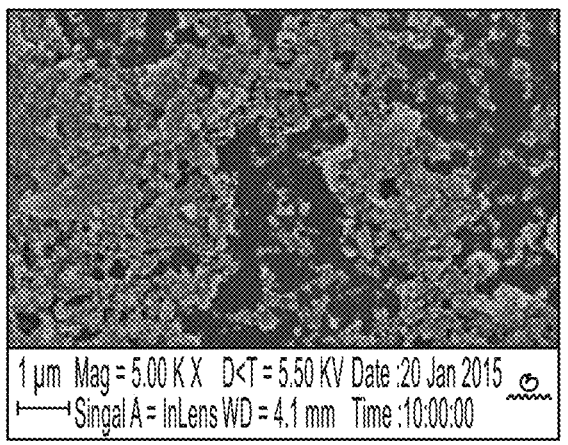 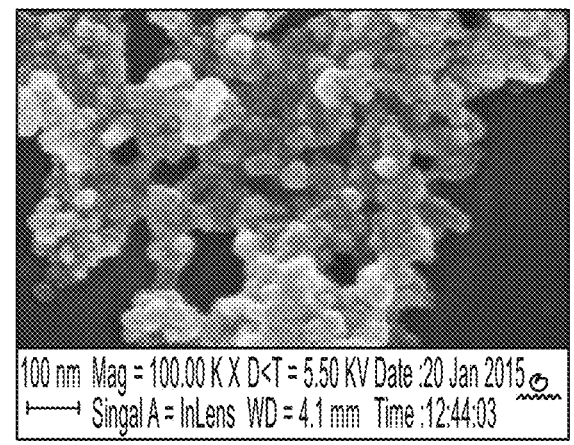
FIG. 2C                    FIG. 2D

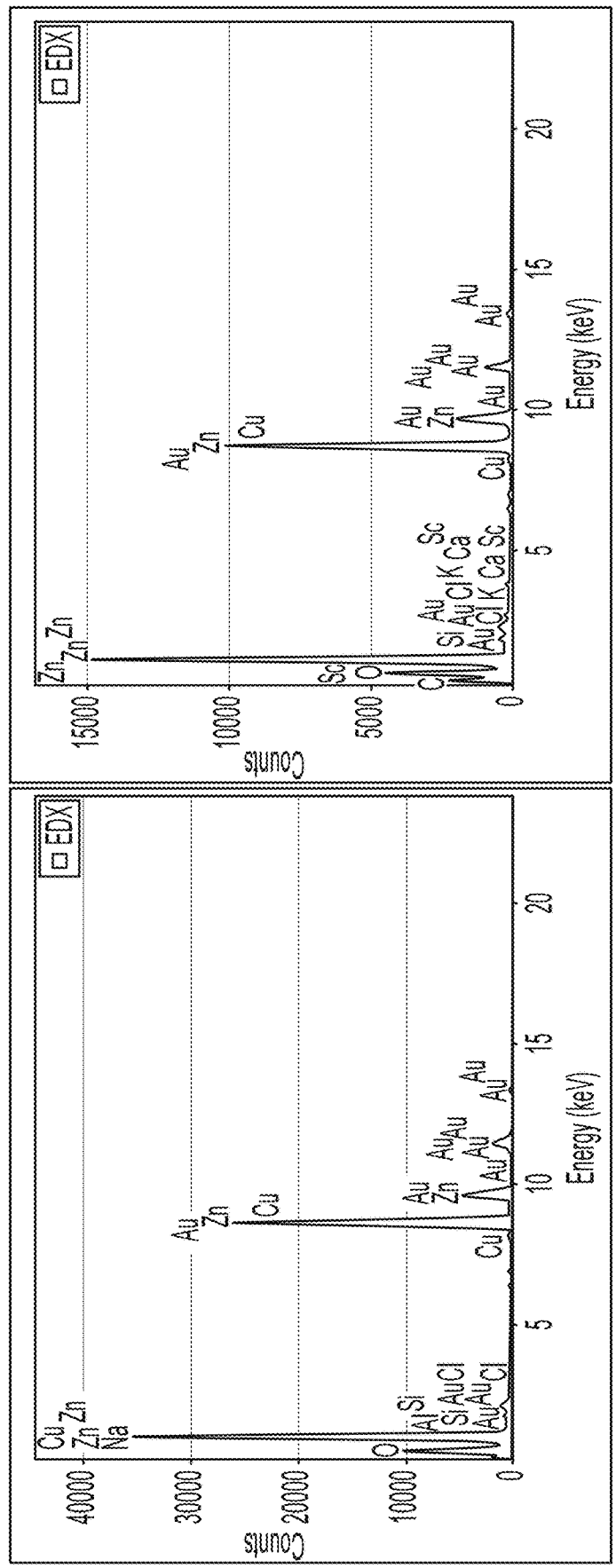

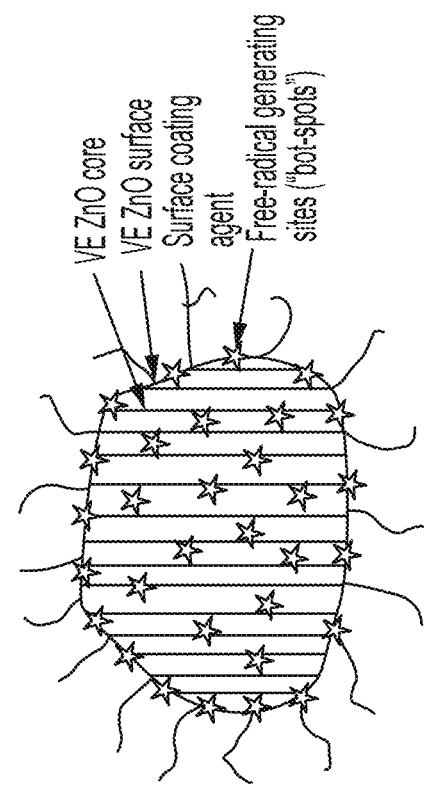
FIG. 10A
FIG. 10B
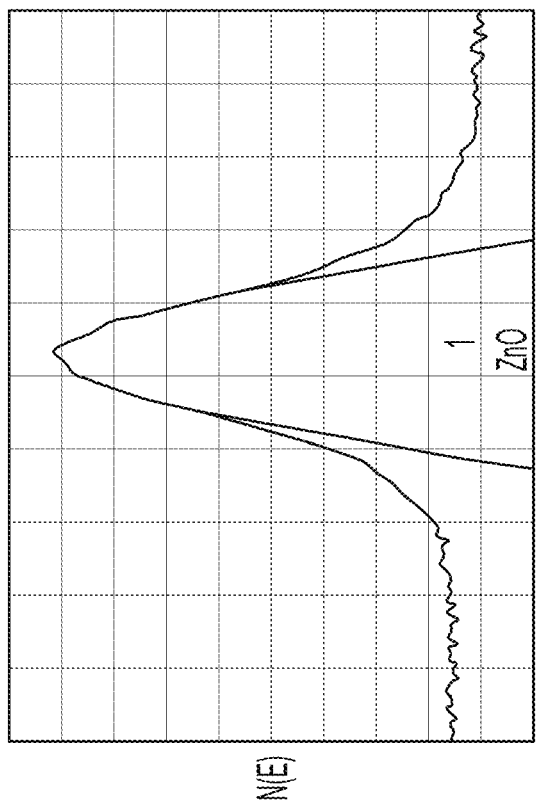
FIG. 11

Germination Test after 5 days of treatment with Snow Pea (Pisum sativum)

| Material | Germination % Concentration (ppm) | | | |
|---|---|---|---|---|
| | 50 | 100 | 250 | 500 |
| Untreated | 100 | 100 | 100 | 100 |
| SG-4 | 96 | 90 | 86 | 83 |
| SG-6 | 100 | 93 | 86 | 80 |
| SG-4-U | 100 | 76 | 80 | 73 |
| SG-6-U | 96 | 93 | 86 | 100 |
| SG-4 (No capping agent) | 100 | 93 | 83 | 63 |
| SG-6 (No capping agent) | 100 | 93 | 93 | 100 |
| Zinc Peroxide | 86 | 86 | 90 | 80 |
| Urea Hydrogen Peroxide | 100 | 96 | 90 | 70 |

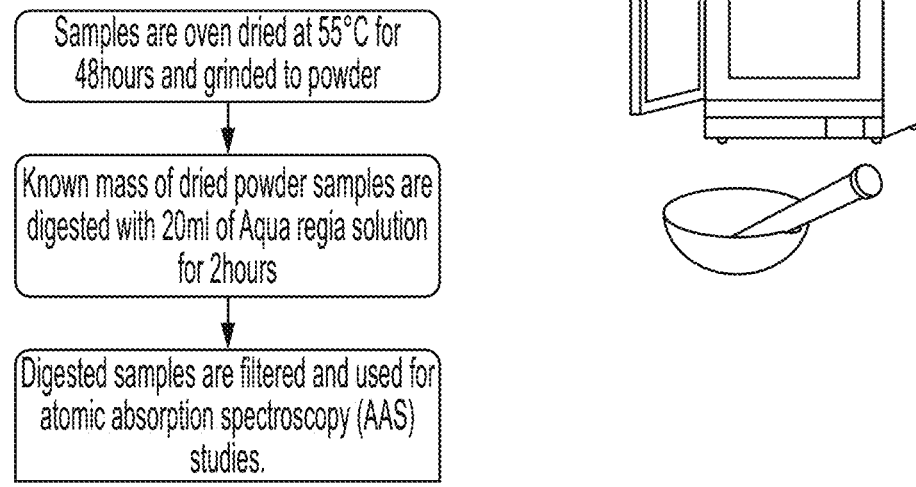
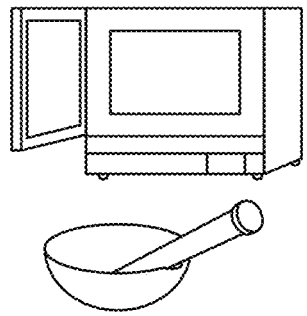
FIG. 14B
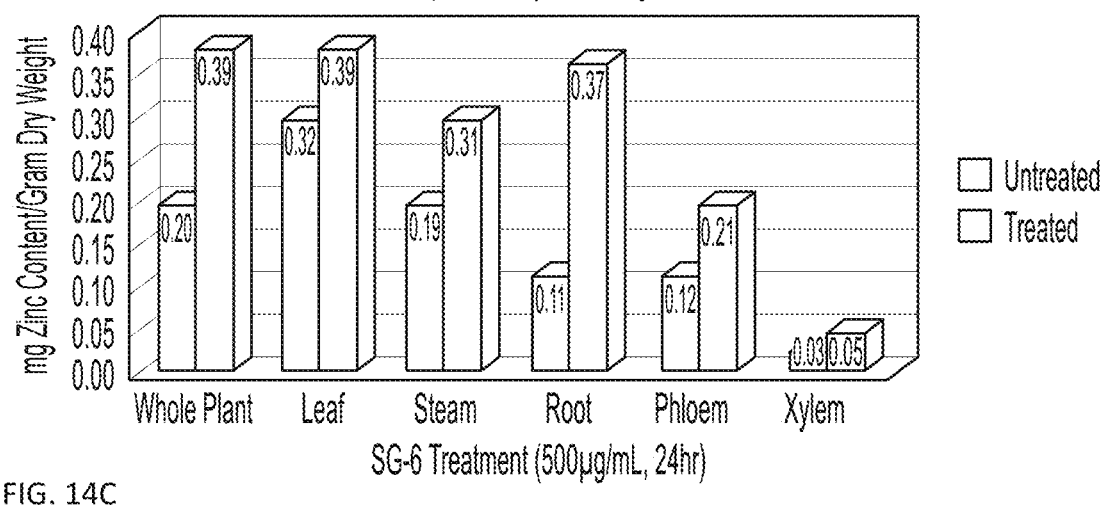
FIG. 14C

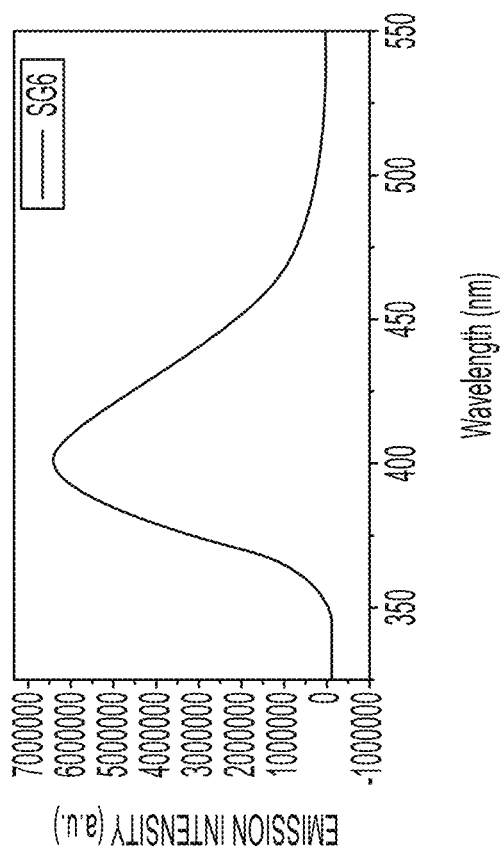
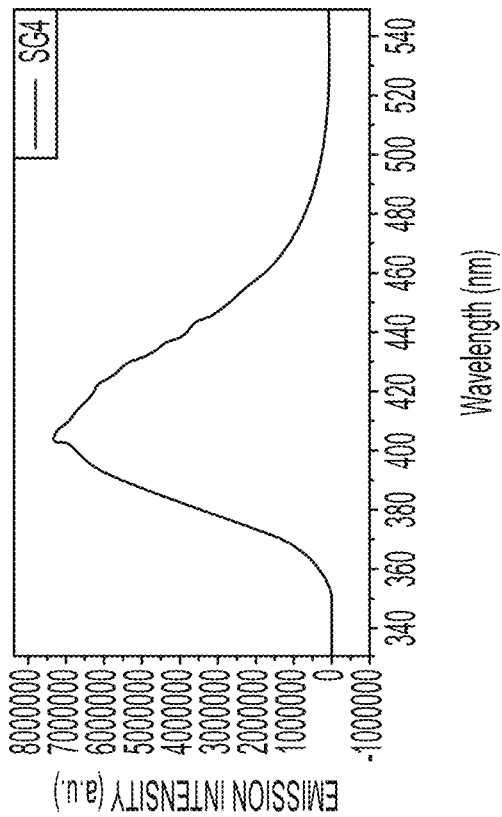
FIG. 16A
FIG. 16B

COMPOSITIONS INCLUDING A VACANCY-ENGINEERED (VE)-ZNO NANOCOMPOSITE, METHODS OF MAKING THE COMPOSITIONS AND METHODS OF USING THE COMPOSITIONS

CROSS-REFERENCE TO RELATED APPLICATION

This application is related to, and derives from, U.S. Provisional Patent Application Ser. No. 62/119,494, filed 23 Feb. 2015 and titled "Compositions Including a Vacancy-Engineered (VE)-ZNO Nanocomposite, Methods of Making a Composition, Methods of Using a Composition."

BACKGROUND

The globalization of business, travel and communication brings increased attention to worldwide exchanges between communities and countries, including the potential globalization of the bacterial and pathogenic ecosystem. Bactericides and fungicides have been developed to control diseases in man, animals, and plants, and must evolve to remain effective as more and more antibiotic, pesticide, and insecticide resistant bacteria and fungi appear around the globe.

Bacterial resistance to antimicrobial agents has also emerged, throughout the world, as one of the major threats to both man and the agrarian lifestyle. Resistance to antibacterial and antifungal agents has emerged as an agricultural issue that requires attention and improvements in the treatment materials in use today.

For example, focusing on plants, there are over 300,000 diseases that afflict plants worldwide, resulting in billions of dollars of annual crop losses. The antibacterial/antifungal formulations in existence today could be improved and made more effective.

SUMMARY

Embodiments of the present disclosure, in one aspect, relate to compositions including a vacancy-engineered (VE)-ZnO nanocomposite, methods of making the composition, methods of using the composition, and the like.

In an embodiment, a composition, among others, includes: a vacancy-engineered (VE)-ZnO nanocomposite including a plurality of interconnected VE-ZnO nanoparticles, wherein the plurality of VE-ZnO nanoparticles has a plurality of surface defects associated with an oxygen vacancy, wherein at least either: (1) the plurality of VE-ZnO nanoparticles each has a diameter of other than about 3 to 8 nm; or wherein (2) the plurality of VE-ZnO nanoparticles each does not includes a coating of a surface capping agent having one or more Zn ion chelating functional groups.

In an embodiment, a method, among others, includes: disposing a composition on a surface, wherein the composition has a vacancy-engineered (VE)-ZnO nanocomposite including a plurality of interconnected VE-ZnO nanoparticles, wherein the plurality of interconnected VE-ZnO nanoparticles has a plurality of surface defects associated with an oxygen vacancy, wherein at least either: (1) the plurality of VE-ZnO nanoparticles each does not have a diameter of about 3 to 8 nm; or wherein (2) the plurality of VE-ZnO nanoparticles each does not include a coating of a surface capping agent having one or more Zn ion chelating functional groups; and killing a substantial portion of a microorganism or inhibiting or substantially inhibiting the growth of the microorganisms on the surface of a structure or that come into contact with the surface of the structure.

In an embodiment, a method, among others, includes: mixing a water soluble zinc source, a surface capping agent, and an oxidizing agent, wherein the surface capping agent has both a carboxyl group and hydroxyl group; and forming a vacancy-engineered (VE)-ZnO nanocomposite including a plurality of interconnected VE-ZnO nanoparticles, wherein the plurality of VE-ZnO nanoparticles has surface defects associated with an oxygen vacancy, wherein at least either: (1) the plurality of VE-ZnO nanoparticles has a diameter of other than about 1 to 10 nm; or wherein (2) the plurality of VE-ZnO nanoparticles does not include a coating formed from the surface capping agent.

Other compositions, methods, features, and advantages will be, or become, apparent to one with skill in the art upon examination of the following drawings and detailed description.

The embodiments contemplate that compositions, methods, features and advantages may include compositions that may be defined with a limited number of limitations, or negative limitations, as presented and described above. It is intended that all such additional structures, compositions, methods, features, and advantages be included within this description, be within the scope of the present disclosure, and be protected by the accompanying claims. A particular composition in accordance with the disclosure with such fewer limitations includes a composition that, among other compositions, includes: a vacancy-engineered (VE)-ZnO nanocomposite including a plurality of interconnected VE-ZnO nanoparticles, wherein the plurality of VE-ZnO nanoparticles has a plurality of surface defects associated with an oxygen vacancy, with the particle size and surface capping agent limitations as described above. The disclosure also contemplates related methods for use of or preparation of the composition.

The disclosure contemplates that the VE-ZnO nanoparticle size range other than about 3 to 8 nm or other than about 1 to 10 nm may be encompassed by a particle range of greater than about 10 nm to about 100 nm, or alternatively greater than about 10 nm to about 200 nm or further alternatively greater than about 10 nm to about 500 nm. Alternatively considered is a range from about 25 to about 500 nm or alternatively from about 50 to about 500 nm. Upper size ranges of up to about 1 micron are considered. By excluding the size range from 1 to 10 nm and 3 to 8 nm it is intended to illustrate that efficacy of a composition in accordance with the disclosure is not necessarily limited to a small size range which has particularly desirable characteristics.

The disclosure also contemplates as operative VE-ZnO nanoparticle sizes smaller than about 1 nm or smaller than about 0.5 nm, either of which may serve as an upper limit in a range having a lower limit bounded by about 0.1 nm.

By excluding the coating formed of the surface capping agent the disclosure is intended to include as viable compositions less complex compositions that include zinc oxide materials that include oxygen materials derived from peroxide materials and hydroxide materials, but absent a layer formed of a surface capping agent.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 illustrates: FIG. 2A A representative low-magnification HRTEM image of Zinkicide™ SG6 material showing gel-like network of inter-connecting ultra-small size (<5 nm) crystalline sol particle clusters. FIG. 2B High-magnification image of Zinkicide™ SG6 material. Inset shows crystalline lattice fringe of one of Zinkicide™ SG6 sol particles. Note: one nm is a billionth of a meter. Field Emission Scanning Electron Microscopy (FE-SEM) images of the material are shown in image FIG. 2C and FIG. 2D.

FIG. 9A illustrates HRTEM—EDX spectra of surface coated VE-ZnO and FIG. 9B illustrates HRTEM—EDX spectra of surface coated ZnO.

FIG. 10A illustrates x-ray photoelectron spectroscopy (XPS) results of surface coated VE-ZnO and FIG. 10B illustrates XPS results of surface coated ZnO.

FIG. 11 illustrates a schematic representation of VE-ZnO ("Zinkicide") nanoparticle composite (nanocomposite).

FIG. 13 illustrates tabular data for germination of VE-ZnO treated snow pea seeds.

FIGS. 14A, 14B and 14C illustrate experimental design and experimental data for tomato plants treated with VE-ZnO nanoparticle composite.

FIGS. 16A and 16B illustrate fluorescence emission spectra for VE-ZnO nanoparticle composites SG4 and SG6.

In FIG. 17A, the curve that corresponds with the peak at 1600 $cm^{-1}$ corresponds with the surface coating agent. The curve that corresponds with the peak at 1350 $cm^{-1}$ corresponds with surface coated ZnO and the remaining curve which does not include a deep peak corresponds with surface coated VE-ZnO. In FIG. 17B, the curve that corresponds with the peak at 3500 $cm^{-1}$ cororesponds with the surface coated VE-ZnO, the curve that corresponds with that peak at 2000 $cm^{-1}$ corresponds with surface coating agent and the remaining curve corresponds with the surface coated VE-ZnO.

DETAILED DESCRIPTION

Figure 1A:
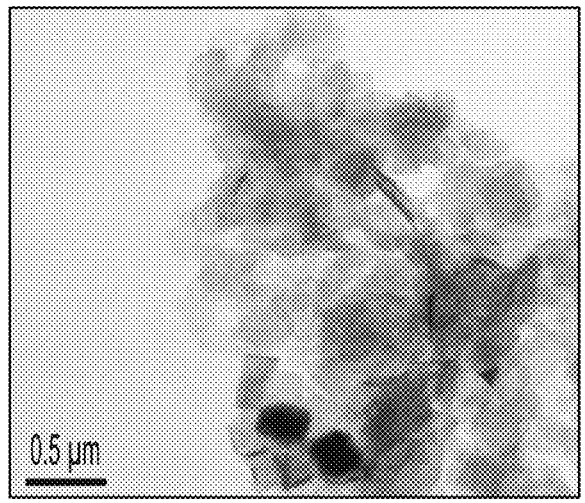
FIG. 1A A representative HRTEM image of Zinkicide™ SG4 showing plate-like faceted structure in the sub-micron size range.
Figure 1B:
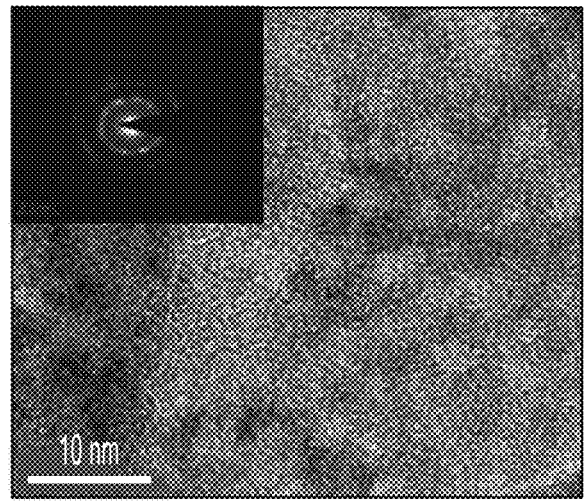
FIG. 1B High-magnification image of coated ZnO material shows appearance of both polycrystalline and amorphous regions within a plate structure. Field Emission Scanning Electron Microscopy (FE-SEM) image of the material are shown in image FIG. 1C and FIG. 1D.
Figure 1C:
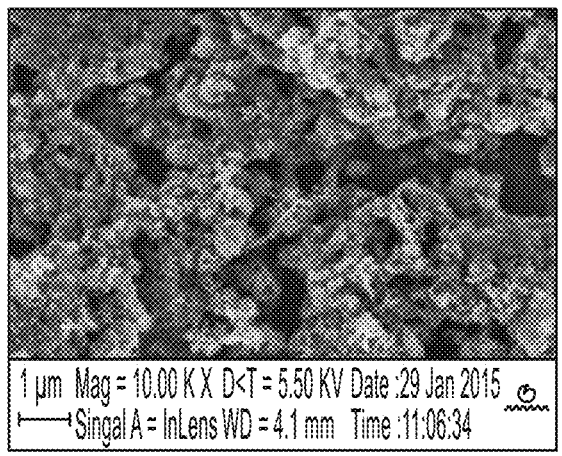
FIG. 1 illustrates.
Figure 1D:
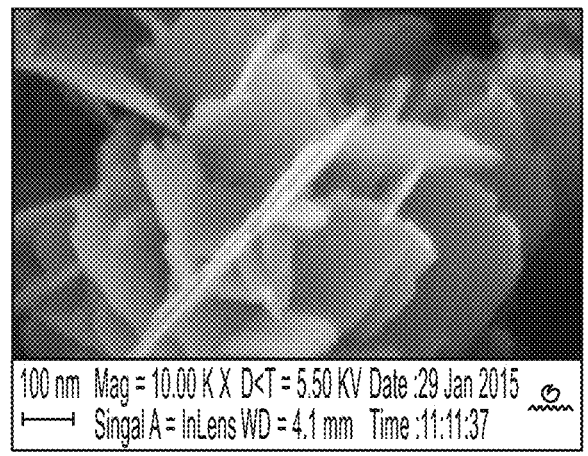
Figure 3A:
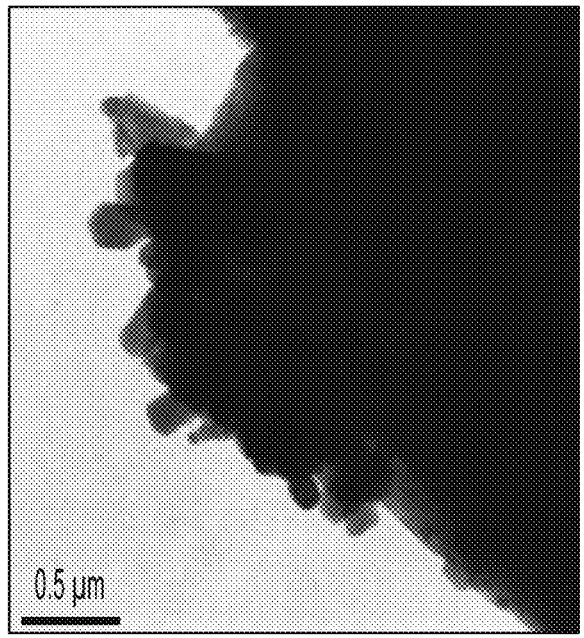
FIG. 3A A representative HRTEM image of Nordox 30/30 WG material showing polydispersed structure in the size ranging from nano to micron size.
Figure 3B:
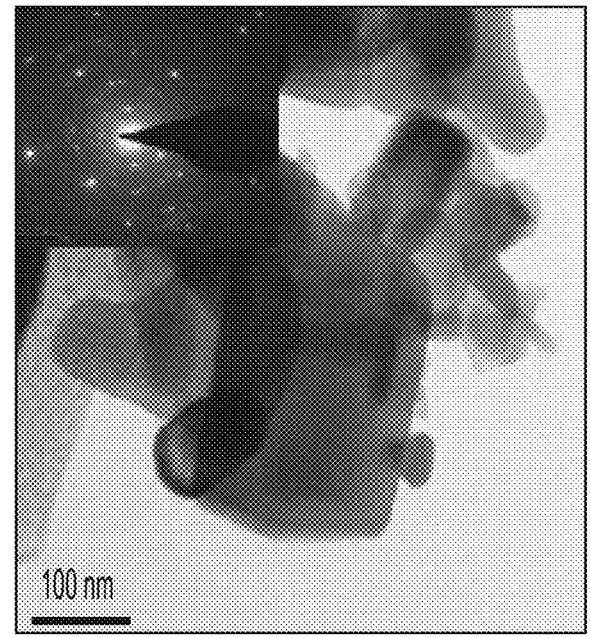
FIG. 3B High-magnification image of Nordox material shows appearance of highly crystalline structure (see inset; HRTEM-SAED pattern showing bright spots confirming crystallinity). Field Emission Scanning Electron Microscopy (FE-SEM) images of the material are shown in image FIG. 3C and FIG. 3D.
Figure 3C:
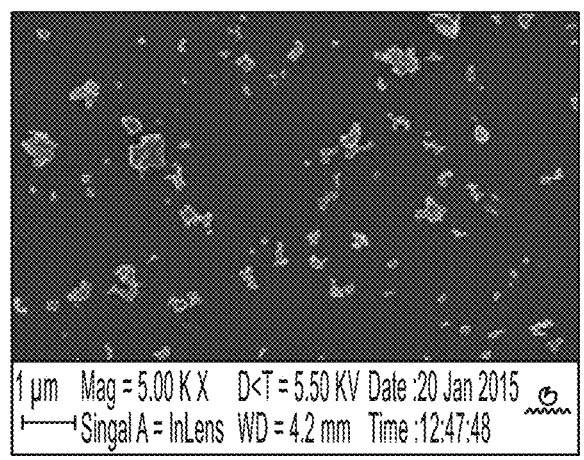
FIG. 3 illustrates.
Figure 3D:
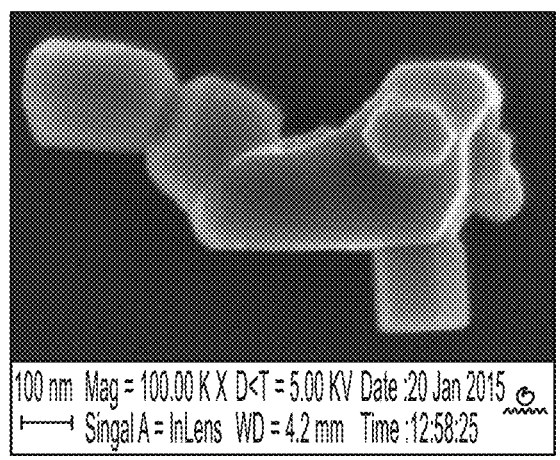
Figures 4A, 4B, 4C, 4D, 4E:
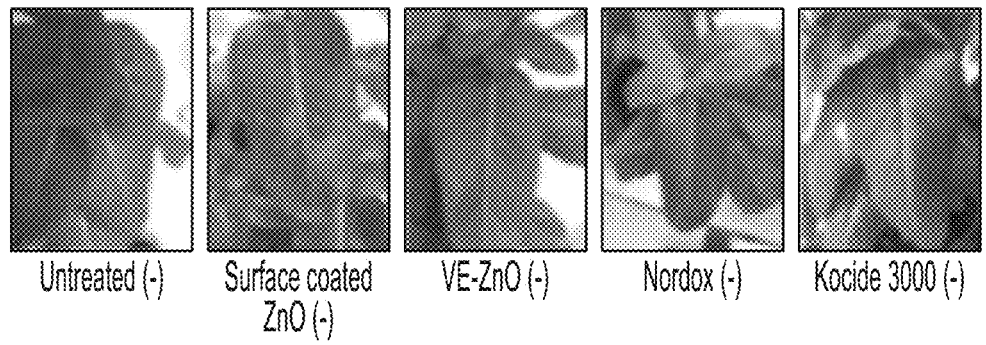
FIGS. 4A through 4E illustrate comparative phytotoxicity results of an uncoated *vinca* plant shown in FIG. 4A, a *vinca* plant surface coated with ZnO shown in FIG. 4B, coated with VE-ZnO shown in FIG. 4C, coated with Nordox shown in FIG. 4D, and coated with Kocide 3000 shown in FIG. 4E.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features that may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, polymer chemistry, biology, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmospheres. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions (which are not Necessarily Limited to the Present Disclosure):

The term "antimicrobial characteristic" refers to the ability to kill and/or inhibit the growth of microorganisms. A substance having an antimicrobial characteristic may be harmful to microorganisms (e.g., bacteria, fungi, protozoans, algae, and the like). A substance having an antimicrobial characteristic can kill the microorganism and/or prevent or substantially prevent or inhibit the growth or reproduction of the microorganism.

The term "antibacterial characteristic" refers to the ability to kill and/or inhibit the growth of bacteria. A substance having an antibacterial characteristic may be harmful to bacteria. A substance having an antibacterial characteristic can kill the bacteria and/or prevent or substantially prevent or inhibit the replication or reproduction of the bacteria.

"Gel matrix" or "Nanogel matrix" refers to amorphous gel like substance that is formed by the interconnection of vacancy engineered crystalline zinc oxide nanoparticles (e.g., about 3 to 8 nm) to one another. In an embodiment, the amorphous gel matrix has no ordered (e.g., defined) structure. In an embodiment, the vacancy engineered zinc oxide nanoparticles are interconnected covalently (e.g., through —Zn—O—Zn— bonds), physically associated via Van der Waal forces, and/or through ionic interactions.

"Uniform plant surface coverage" refers to a uniform and complete (e.g., about 100%) wet surface due to spray application of embodiments of the present disclosure. In other words, spray application causes embodiments of the present disclosure to spread throughout the plant surface.

"Substantial uniform plant surface coverage" refers to about 70% or more, about 80% or more, about 90% or more, or more uniform plant surface coverage.

"Substantially covering" refers to covering about 70% or more, about 80% or more, about 90% or more, or more, of the leaves and branches of a plant.

"Plant" refers to trees, plants, shrubs, flowers, and the like as well as portions of the plant such as twigs, leaves, stems, branches, fruit, flowers, and the like. In a particular embodiment, the term plant includes a fruit tree such as a citrus tree (e.g., orange tree, lemon tree, lime tree, and the like).

As used herein, "treat," "treatment," "treating," and the like refer to acting upon a disease or condition with a composition of the present disclosure to affect the disease or condition by improving or altering it. In addition, "treatment" includes completely or partially preventing (e.g., about 70% or more, about 80% or more, about 90% or more, about 95% or more, or about 99% or more) a plant form acquiring a disease or condition. The phrase "prevent" can be used instead of treatment for this meaning. "Treatment," as used herein, covers one or more treatments of a disease in a plant, and includes: (a) reducing the risk of occurrence of the disease in a plant predisposed to the disease but not yet diagnosed as infected with the disease (b) impeding the development of the disease, and/or (c) relieving the disease, e.g., causing regression of the disease and/or relieving one or more disease symptoms.

As used herein, the terms "application," "apply," and the like, within the context of the terms "treat," "treatment," "treating" or the like, refers to the placement or introduction of a composition of the disclosure onto or into a "plant" in accordance with the disclosure so that the composition in accordance with the disclosure may "treat" a plant disease in accordance with the disclosure. The Detailed Description of the Embodiments specifically teach: (1) a foliar "application" through use of a spray method or a drench method with respect to a "plant" leaf; or (2) a root "application" through the spray method or the drench method with respect to a growth medium. Within this disclosure an "application" is intended to be broadly interpreted to include any extrinsic method or activity that provides for, or results in, introduction of a composition in accordance with the disclosure onto or into a "plant" in accordance with the disclosure. Such methods or activities may include, but are not necessarily limited to spray methods, drench methods and hypodermic or other injection methods.

The terms "bacteria" or "bacterium" include, but are not limited to, Gram positive and Gram negative bacteria. Bacteria can include, but are not limited to, *Abiotrophia, Achromobacter, Acidaminococcus, Acidovorax, Acinetobacter, Actinobacillus, Actinobaculum, Actinomadura, Actinomyces, Aerococcus, Aeromonas, Afipia, Agrobacterium, Alcaligenes, Alloiococcus, Alteromonas, Amycolata, Amycolatopsis, Anaerobospirillum, Anabaena affinis* and other cyanobacteria (including the *Anabaena, Anabaenopsis, Aphanizomenon, Camesiphon, Cylindrospermopsis, Gloeobacter Hapalosiphon, Lyngbya, Microcystis, Nodularia, Nostoc, Phormidium, Planktothrix, Pseudoanabaena, Schizothrix, Spirulina, Trichodesmium*, and *Umezakia* genera) *Anaerorhabdus, Arachnia, Arcanobacterium, Arcobacter, Arthrobacter, Atopobium, Aureobacterium, Bacteroides, Balneatrix, Bartonella, Bergeyella, Bifidobacterium, Bilophila Branhamella, Borrelia, Bordetella, Brachyspira, Brevibacillus, Brevibacterium, Brevundimonas, Brucella, Burkholderia, Buttiauxella, Butyrivibrio, Calymmatobacte-*

*rium, Campylobacter, Capnocytophaga, Cardiobacterium, Catonella, Cedecea, Cellulomonas, Centipeda, Chlamydia, Chlamydophila, Chromobacterium, Chyseobacterium, Chryseomonas, Citrobacter, Clostridium, Collinsella, Comamonas, Corynebacterium, Coxiella, Cryptobacterium, Delftia, Dermabacter, Dermatophilus, Desulfomonas, Desulfovibrio, Dialister, Dichelobacter, Dolosicoccus, Dolosigranulum, Edwardsiella, Eggerthella, Ehrlichia, Eikenella, Empedobacter, Enterobacter, Enterococcus, Erwinia, Erysipelothrix, Escherichia, Eubacterium, Ewingella, Exiguobacterium, Facklamia, Filifactor, Flavimonas, Flavobacterium, Francisella, Fusobacterium, Gardnerella, Gemella, Globicatella, Gordona, Haemophilus, Hafnia, Helicobacter, Helococcus, Holdemania Ignavigranum, Johnsonella, Kingella, Klebsiella, Kocuria, Koserella, Kurthia, Kytococcus, Lactobacillus, Lactococcus, Lautropia, Leclercia, Legionella, Leminorella, Leptospira, Leptotrichia, Leuconostoc, Listeria, Listonella, Megasphaera, Methylobacterium, Microbacterium, Micrococcus, Mitsuokella, Mobiluncus, Moellerella, Moraxella, Morganella, Mycobacterium, Mycoplasma, Myroides, Neisseria, Nocardia, Nocardiopsis, Ochrobactrum, Oeskovia, Oligella, Orientia, Paenibacillus, Pantoea, Parachlamydia, Pasteurella, Pediococcus, Peptococcus, Peptostreptococcus, Photobacterium, Photorhabdus, Phytoplasma, Plesiomonas, Porphyrimonas, Prevotella, Propionibacterium, Proteus, Providencia, Pseudomonas, Pseudonocardia, Pseudoramibacter, Psychrobacter, Rahnella, Ralstonia, Rhodococcus, Rickettsia Rochalimaea Roseomonas, Rothia, Ruminococcus, Salmonella, Selenomonas, Serpulina, Serratia, Shewenella, Shigella, Simkania, Slackia, Sphingobacterium, Sphingomonas, Spirillum, Spiroplasma, Staphylococcus, Stenotrophomonas, Stomatococcus, Streptobacillus, Streptococcus, Streptomyces, Succinivibrio, Sutterella, Suttonella, Tatumella, Tissierella, Trabulsiella, Treponema, Tropheryma, Tsakamurella, Turicella, Ureaplasma, Vagococcus, Veillonella, Vibrio, Weeksella, Wolinella, Xanthomonas, Xenorhabdus, Yersinia,* and *Yokenella*. Other examples of bacterium include *Mycobacterium tuberculosis, M bovis,* M *typhimurium, M bovis* strain BCG, BCG substrains, *M. avium, M. intracellulare, M. africanum, M. kansasii, M. marinum, M. ulcerans, M. avium* subspecies paratuberculosis, *Staphylococcus aureus, Staphylococcus epidermidis, Staphylococcus equi, Streptococcus pyogenes, Streptococcus agalactiae, Listeria monocytogenes, Listeria ivanovii, Bacillus anthracis, B. subtilis, Nocardia asteroides,* and other *Nocardia* species, *Streptococcus viridans* group, *Peptococcus* species, *Peptostreptococcus* species, *Actinomyces israelii* and other *Actinomyces* species, and *Propionibacterium acnes, Clostridium tetani, Clostridium botulinum,* other *Clostridium* species, *Pseudomonas aeruginosa,* other *Pseudomonas* species, *Campylobacter* species, *Vibrio cholera, Ehrlichia* species, *Actinobacillus pleuropneumoniae, Pasteurella haemolytica, Pasteurella multocida,* other *Pasteurella* species, *Legionella pneumophila,* other *Legionella* species, *Salmonella typhi,* other *Salmonella* species, *Shigella* species *Brucella abortus,* other *Brucella* species, *Chlamydi trachomatis, Chlamydia psittaci, Coxiella burnetti, Escherichia coli, Neiserria meningitidis, Neiserria gonorrhea, Haemophilus influenzae, Haemophilus ducreyi,* other Hemophilus species, *Yersinia pestis, Yersinia enterolitica,* other *Yersinia* species, *Escherichia coli,* E. hirae and other *Escherichia* species, as well as other *Enterobacteria, Brucella abortus* and other *Brucella* species, *Burkholderia cepacia, Burkholderia pseudomallei, Francisella tularensis, Bacteroides fragilis, Fudobascterium nucleatum, Provetella* species, and *Cowdria ruminantium,* or any strain or variant thereof. The Gram-positive bacteria may include, but is not limited to, Gram positive Cocci (e.g., *Streptococcus, Staphylococcus,* and *Enterococcus*). The Gram-negative bacteria may include, but is not limited to, Gram negative rods (e.g., Bacteroidaceae, Enterobacteriaceae, Vibrionaceae, Pasteurellae and Pseudomonadaceae). In an embodiment, the bacteria can include *Mycoplasma pneumoniae.*

The term "protozoan" as used herein includes, without limitations *flagellates* (e.g., *Giardia lamblia*), amoeboids (e.g., *Entamoeba histolitica*), and sporozoans (e.g., *Plasmodium knowlesi*) as well as ciliates (e.g., *B. coli*). Protozoan can include, but it is not limited to, *Entamoeba coli, Entamoeabe histolitica, Iodoamoeba buetschlii, Chilomastix meslini, Trichomonas vaginalis, Pentatrichomonas homini, Plasmodium vivax, Leishmania braziliensis, Trypanosoma cruzi, Trypanosoma brucei,* and *Myxoporidia.*

The term "algae" as used herein includes, without limitations microalgae and filamentous algae such as *Anacystis nidulans, Scenedesmus* sp., *Chlamydomonas* sp., *Clorella* sp., *Dunaliella* sp., *Euglena* so., *Prymnesium* sp., *Porphyridium* sp., *Synechoccus* sp., *Botyrococcus braunii, Crypthecodinium cohnii, Cylindrotheca* sp., *Microcystis* sp., *Isochrysis* sp., *Monallanthus saliva, M. minutum, Nannochloris* sp., *Nannochloropsis* sp., *Neochloris oleoabundans, Nitzschia* sp., *Phaeodactylum tricornutum, Schizochrtrium* sp., *Senedesmus obliquus,* and *Tetraselmis sueica* as well as algae belonging to any of *Spirogyra, Cladophora, Vaucheria, Pithophora* and *Enteromorpha* genera.

The term "fungi" as used herein includes, without limitations, a plurality of organisms such as molds, mildews and rusts and include species in the *Penicillium, Aspergillus, Acremonium, Cladosporium, Fusarium, Mucor, Nerospora, Rhizopus, Tricophyton, Botryotinia, Phytophthora, Ophiostoma, Magnaporthe, Stachybotrys* and *Uredinalis* genera.

Discussion:

In accordance with the purpose(s) of the present disclosure, as embodied and broadly described herein, embodiments of the present disclosure, in one aspect, relate to compositions including a vacancy-engineered (VE)-ZnO nanocomposite, methods of making the composition, methods of using the composition, and the like.

In an embodiment, the composition can be used as an antimicrobial agent to kill and/or inhibit the formation of microorganisms on a surface such as a tree, plant, and the like. An advantage of the present disclosure is that the composition is water soluble, film-forming, has antimicrobial properties, and is non-phytotoxic. In particular, the composition is antimicrobial towards *E. coli* and *X. alfalfae* and is nonphytotoxic to ornamental *vinca* sp. In embodiments the composition has antimicrobial activity towards mircobial organisms, such as, but not limited to, *Xanthomonas citri* subsp. *citri,* a causal agent of Citrus Canker; *Elsinoe fawcetti*, a causal agent of citrus scab; and *Diaporthe citri*, a causal agent of melanose.

In other embodiments, the composition can be used as a systemic antimicrobial agent to kill and/or inhibit the formation and/or growth of microorganisms within a plant, tree, and the like. In such embodiments, the VE-ZnO nanocomposite particles are able to enter the plant via the roots/vascular system and/or via the leaf stroma. In such embodiments, the size of the coated VE-ZnO particles are similar to the size of phloem proteins (e.g., approximately 10 nm or less) and can thus be transported to phloem regions of plant species. This allows the particles to combat pathogens that reside inside of the plant organism, such as *Candidatus liberibacter asiaticus* (CLas), which a causal agent of Huanglongbing (HLB).

In addition, embodiments of the present disclosure provide for a composition that can be used for multiple purposes. Embodiments of the present disclosure are advantageous in that they can substantially prevent and/or treat or substantially treat a disease or condition in a plant and act as an antibacterial and/or antifungal, while being non-phytotoxic.

In an embodiment, the composition may have an antimicrobial characteristic. The phrase "antimicrobial characteristic" can have the following meaning: kills about 70% or more, about 80% or more, about 90% or more, about 95% or more, or about 99% or more, of the microorganisms (e.g., bacteria) on the surface and/or reduces the amount of microorganisms that form or grow on the surface by about 70% or more, about 80% or more, about 90% or more, about 95% or more, or about 99% or more, as compared to a similar surface without the composition disposed on the surface.

Although not intending to be bound by theory, the unique surface charge and surface chemistry of the VE-ZnO nanoparticles of the VE-ZnO nanocomposite may be responsible for maintaining good colloidal stability. The high surface area and gel-like structural morphology may be responsible for the strong adherence properties to a surface, such as a plant surface. The non-phytotoxicity may be attributed to the neutral pH of the VE-ZnO nanocomposite and limited availability of soluble ions. Additional details are described in the Examples.

In an embodiment, the VE-ZnO nanocomposite can include VE-ZnO nanoparticles such as zinc peroxide (ZnO2) or a combination of ZnO and ZnO2. In an embodiment, the VE-ZnO nanoparticles have surface defects associated with oxygen vacancy, which distinguishes the VE-ZnO nanoparticles from ZnO nanoparticles. UV-Vis studies have shown that VE-ZnO nanoparticles and ZnO nanoparticles have different optical characteristics, which is indicative of showing that VE-ZnO nanoparticles have surface defects associated with oxygen vacancy. Additional details are provided in the Examples.

In an embodiment, the diameter of the zinc oxide nanoparticles can be controlled by appropriately adjusting synthesis parameters, such as amounts of the water soluble zinc source, the surface capping agent, and the oxidizing agent, base, pH, time of reaction, sequence of addition of the components, and the like. For example, the diameter of the particles can be controlled by adjusting the time frame of the reaction. Although not intending to be bound by theory, the superior antimicrobial efficacy of embodiments of the present disclosure can be attributed to the quantum confinement (e.g., size) and surface defect related properties of the VE-ZnO nanoparticle. The size of the VE-ZnO nanoparticle may allow the VE-ZnO nanoparticles to be transported systematically into the plant, reach the phloem tissue, and interact with the pathogen, for example. In an embodiment, the VE-ZnO nanoparticle can have a diameter of about 1 to 10 nm or about 5 nm or the average diameter is about 5 nm. In embodiments the VE-ZnO nanoparticle can have a diameter of about 10 nm or less. In other embodiments, the VE-ZnO nanoparticle can have a plate-like structure, with a thickness of about 10 nm or less, but with a diameter in the sub-micrometer range, e.g., 0.2 to 0.5 micrometers, giving a large surface area.

In an embodiment, the VE-ZnO nanoparticles can be inter-connected to one another to form inter-connected VE-ZnO nanoparticle chains. In an embodiment, the VE-ZnO nanocomposite can include a plurality of VE-ZnO nanoparticle chains, where the chains can be independent of one another or connect to one or more other chains.

In an embodiment, the VE-ZnO nanoparticles include a coating on the surface made of the surface capping agent. In an embodiment, the surface capping agent includes one or more Zn ion chelating functional groups such as carboxyl groups, hydroxyl groups, amines, thiols, and/or a combination of two or more. In an embodiment, the surface capping agent includes a compound having a carboxyl group and hydroxyl group. In an embodiment the surface capping agent is selected from a small molecule capping agent such as sodium salicylate, sodium gluconate, as well as polymers such as chitosan, silica, polyacrylic acid, polyvinyl alcohol, polyacrylamide, polyvinyl pyrrolidine, dextran, polyethelene glycol, dendrimers, and a combination thereof. In an embodiment, the coating can cover the entire surface of the VE-ZnO nanoparticle or a substantial portion (e.g., about 50% or more, about 60% or more, about 70% or more, about 80% or more, about 90% or more, about 95% or more, or about 99% or more, of the surface of the VE-ZnO nanoparticle) of the surface of the VE-ZnO nanoparticle. In an embodiment, the coating can have a thickness of about 0.5 nm to 10 nm.

In an embodiment, the VE-ZnO nanocomposite can include the VE-ZnO nanoparticles in a gel-matrix. In an embodiment, the gel matrix can include a water soluble zinc source, a surface capping agent, and an oxidizing agent. In an embodiment, the surface capping agent can include compounds such as those recited above (e.g., sodium salicylate). In an embodiment, the oxidizing agent can be about 10 to 50 or about 25 to 35, weight percent of the VE-ZnO nanocomposite gel matrix.

In an embodiment, the water soluble zinc source can include a water soluble zinc salt, and organo zinc complexes such as zinc tartarate, zinc citrate, zinc oxalate, zinc acetate, and the like. In an embodiment, the water soluble zinc salt can include zinc nitrate, zinc sulfate, and zinc chloride. In an embodiment, the water soluble zinc source can be about 40 to 80 or about 50 to 70, weight percent of the VE-ZnO nanocomposite gel matrix.

In an embodiment, the oxidizing agent is selected from hydrogen peroxide, chlorine, sodium hypochlorite, and a combination thereof. In an embodiment, the oxidizing agent can be about 10 to 50 or about 25 to 35, weight percent of the VE-ZnO nanocomposite gel matrix.

In an embodiment, the method of making a composition can include mixing a water soluble zinc source, a surface capping agent, and an oxidizing agent. In an embodiment, the components are mixed in an aqueous solution (e.g., deionized water). In an embodiment, the components are mixed at room temperature and after mixing for about 12 to 36 hours, the pH can be adjusted to about 7.5 with a base such as NaOH. In an embodiment, the components can be simultaneously added together or can be sequentially added together. For example, the surface capping agent and the oxidizing agent can be mixed, and optionally with a base. Then the water soluble zinc source can be slowly added dropwise over the course of a few minutes to an hour, while stirring.

In an embodiment, the oxidizing agent can be about 10 to 50 or about 25 to 35, weight percent of the VE-ZnO nanocomposite. In an embodiment, the water soluble zinc source can be about 40 to 80 or about 50 to 70, weight percent of the VE-ZnO nanocomposite. In an embodiment, the oxidizing agent can be about 10 to 50 or about 25 to 35, weight percent of the VE-ZnO nanocomposite.

In specific embodiments the VE-ZnO nanocomposite includes VE-ZnO particles having a plate-like structure with a relatively large surface area. In embodiments the VE-ZnO particles are made with zinc nitrate, sodium hydroxide and sodium salicylate, resulting in ZnO particles with a coating of sodium salicylate. In some other specific embodiments, the VE-ZnO nanocomposite includes VE-ZnO particles in the 3-8 nm range (average of about 5 nm in diameter) made from zinc nitrate, hydrogen peroxide, sodium hydroxide, resulting in ZnO (and possibly in combination with ZnO2) particles with a coating of sodium salicylate.

Once the components are mixed, the VE-ZnO nanocomposite is formed, where the VE-ZnO nanoparticles have a coating formed from the surface capping agent. The composition can be used as prepared or unbound components (e.g., the water soluble zinc source, the surface capping agent, and the oxidizing agent, and base) can be rinsed off so that only the inter-connected VE-ZnO nanoparticles remain. This process can be performed using a single reaction vessel or can use multiple reaction vessels. Addition details are provided in the Examples.

In an embodiment, the composition can be disposed on a surface of a structure. In an embodiment, the structure can include plants such as trees, shrubs, grass, agricultural crops, and the like, includes leaves and fruit. In an embodiment, the composition provides uniform plant surface coverage, substantial uniform plant surface coverage, or substantially covers the plant. In an embodiment, the composition can be used to treat a plant having a disease or to prevent the plant from obtaining a disease.

In an embodiment, the structure can include those that may be exposed to microorganisms and/or that microorganisms can grow on, such as, without limitation, fabrics, cooking counters, food processing facilities, kitchen utensils, food packaging, swimming pools, metals, drug vials, medical instruments, medical implants, yarns, fibers, gloves, furniture, plastic devices, toys, diapers, leather, tiles, and flooring materials. In an embodiment, the structure can include textile articles, fibers, filters or filtration units (e.g., HEPA for air and water), packaging materials (e.g., food, meat, poultry, and the like food packaging materials), plastic structures (e.g., made of a polymer or a polymer blend), glass or glass like structures on the surface of the structure, metals, metal alloys, or metal oxides structure, a structure (e.g., tile, stone, ceramic, marble, granite, or the like), and a combination thereof.

In an embodiment, after the composition is disposed on the surface, the structure may have an antimicrobial characteristic that is capable of killing a substantial portion of the microorganisms (e.g., bacteria such as *E. coli*, X. alfalfae, and *S. aureus*) on the surface of the structure and/or inhibits or substantially inhibits the growth of the microorganisms on the surface of the structure. The phrase "killing a substantial portion" includes killing about 70% or more, about 80% or more, about 90% or more, about 95% or more, or about 99% or more, of the microorganism (e.g., bacteria) on the surface that the composition is disposed on, relative to structure that does not have the composition disposed thereon. The phrase "substantially inhibits the growth" includes reducing the growth of the microorganism (e.g., bacteria) by about 70% or more, about 80% or more, about 90% or more, about 95% or more, or about 99% or more, of the microorganisms on the surface that the composition is disposed on, relative to a structure that does not have the composition disposed thereon.

In other embodiments, the composition is disposed on the soil or other growth substrate in which a plant is growing. In this manner, application facilitates update of the composition by the plant root system and systemic delivery of the composition to various internal regions of the plant. In embodiments, the composition can also be taken up systemically even when delivered to the surface of the plant as described above (e.g., where the plant leaf stomata can take in the particles of the composition). When delivered systemically, the composition may have an antimicrobial characteristic that is capable of killing a substantial portion of the microorganisms (e.g., bacteria such as X *citri*, *E. fawcetti*, and *D. citri*) in the plant systems and/or inhibits or substantially inhibits the growth of the microorganisms within the plant organism. The phrase "killing a substantial portion" includes killing about 70% or more, about 80% or more, about 90% or more, about 95% or more, or about 99% or more, of the microorganism (e.g., bacteria) within the plant to which the composition is applied/delivered to, relative a plant that did not receive delivery/application of the composition. The phrase "substantially inhibits the growth" includes reducing the growth of the microorganism (e.g., bacteria) by about 70% or more, about 80% or more, about 90% or more, about 95% or more, or about 99% or more, of the microorganism within the plant organism.

As mentioned above, embodiments of the present disclosure are effective for the treatment of diseases affecting plants such as citrus plants and trees. In an embodiment, the composition can function as an antibacterial and/or antifungal, specifically, treating, substantially treating, preventing or substantially preventing, plant diseases such as citrus greening (HLB) and citrus canker diseases. The hydroxyl free radicals, zinc ions, and a combination thereof can act as an antibacterial and/or antifungal for a period of time (e.g., from application to days to months). The design of the composition facilitates uniform plant surface coverage or substantially uniform plant surface coverage, and in some embodiments facilitates systemic uptake of the composition by the plant vascular system (e.g., via stromata or root system) and transported to phloem regions of a plant. In an embodiment, the composition that is applied to plants can have a superior adherence property in various types of exposure to atmospheric conditions such as rain, wind, snow, and sunlight, such that it is not substantially removed over the time frame for use of the composition. In an embodiment, the composition has a reduced phytotoxic effect or is non-phytotoxic to plants.

Embodiments of the present disclosure can applied on the time frames consistent with the effectiveness of the composition, and these time frames can include from the first day of application to about a week, about a month, about two months, about three months, about four months, about five months, about six months, about seven month, or about eight months.

In the examples that follow and within the context of use of the foregoing Zinkicide materials the embodiments focus on a Zinkicide SG6 material and a Zinciside SG4 material. The difference between the Zinkicide SG6 and Zinkicide SG4 composition is that Zinkicide SG6 contains hydrogen peroxide but Zinkicide SG4 does not. Zinkicide SG4 is made of ZnO inorganic crystals (2D plate-like structure, see the HRTEM and SEM images; HRTEM image shows each plate is made of inter-connecting ultra-small crystals). When synthesis is carried out in presence of hydrogen peroxide, this 2D structure is further oxidized to form ZnO/ZnO2 (Zn oxide/Zn peroxide) composite material (which appears as particulate structures in SEM). ZnO is a good stabilizer for hydrogen peroxide. ZnO2 is a fairly stable inorganic compound. ZnO and ZnO2 have different crystal structures which produces surface defects in the composite. ZnO can produce ROS (such as hydrogen peroxide) with some surface defects. However, the ROS production is drastically enhanced in ZnO/ZnO2 composite as it has more surface defects and in addition the composite contains peroxide. ZnO2 decomposes to ZnO over time and this process is dependent on the environmental conditions.

Example 1

Materials and Methods

Formulation abbreviations: Z-SG-1, ZPER-SG-1, ZPER-SG-2, ZSAL-SG-2, ZPSAL-SG-3, ZPSAL-SG-4, ZPSAL-SG-5, ZPSAL-SG-6, ZPSAL-SG-7

Detailed nanoformulation synthesis procedure: Z-SG-1, ZPER-SG-1, ZSAL-SG-2, ZPSAL-SG-3 and ZPSAL-SG-4 synthesis procedure:

In a glass beaker, take 50 ml deionized water, 5 ml Zn nitrate stock solution (59 weight %), add 1M NaOH dropwise under magnetic stirring until pH is 7.5. Then divide into 5 equal parts:

Z-SG-1: no treatment

ZPER-SG-1: add 2 ml hydrogen peroxide (30%)

ZSAL-SG-2: add 1 ml of sodium salicylate solution (32.8 weight %)

ZPSAL-SG-3: add 1 ml of sodium salicylate solution (32.8 weight %), wash to remove unbound sodium salicylate solution, add 2 ml hydrogen peroxide (30%)

ZPSAL-SG-4: add 2 ml hydrogen peroxide (30%), stir for 2 hours, wash to remove unbound hydrogen peroxide, add 1 ml of sodium salicylate solution (32.8 weight %), wash ZPER-SG-2 and ZPSAL-SG-5 Synthesis Procedure:

In a glass beaker, take 40 ml deionized water, 10 ml hydrogen peroxide (30%) and 5 ml Zn nitrate stock solution (59 weight %). Adjust pH to 7.5 with 1N NaOH. Then, divide into 2 equal parts ZPER-SG-2: no treatment ZPSAL-SG-5: add 2.5 ml sodium salicylate solution (32.8 weight %), check pH— adjust to 7, let stir overnight.

ZPSAL-SG-6 Synthesis Procedure (Coated VE-ZnO)**:

In a glass beaker, take 40 ml deionized water, 10 ml hydrogen peroxide (30%), 2.5 ml sodium salicylate solution (32.8 weight %) and 5 ml Zn Nitrate stock solution (59 weight %). Magnetically stir overnight then adjust pH to 7.5 with 1N NaOH (approximately 25 ml). **Coated ZnO material is identical to coated VE-ZnO except that it contains no hydrogen peroxide.

ZPSAL-SG-7 synthesis procedure: In a glass beaker, take 40 ml deionized water, 10 ml hydrogen peroxide (30%), 2.5 ml sodium salicylate solution (32.8 weight %) and add approximately 20 ml 1N NaOH. Then add dropwise (very carefully and slowly; a few drops per minute) Zn Nitrate solution (59 weight %) under vigorous magnetic stirring until pH is reached to 7.5.

FIG. 1 illustrates: (a) A representative HRTEM image of Zinkicide™ SG4 showing plate-like faceted structure in the sub-micron size range. (b) High-magnification image of coated ZnO material shows appearance of both polycrystalline and amorphous regions within a plate structure. Field Emission Scanning Electron Microscopy (FE-SEM) image of the material are shown in image (c) and (d).

FIG. 2 illustrates: (a) A representative low-magnification HRTEM image of Zinkicide™ SG6 material showing gel-like network of inter-connecting ultra-small size (<5 nm) crystalline sol particle clusters. (b) High-magnification image of Zinkicide™ SG6 material. Inset shows crystalline lattice fringe of one of Zinkicide™ SG6 sol particles. Note: one nm is a billionth of a meter. Field Emission Scanning Electron Microscopy (FE-SEM) images of the material are shown in image (c) and (d).

FIG. 3 illustrates: (a) A representative HRTEM image of Nordox 30/30 WG material showing polydispersed structure in the size ranging from nano to micron size. (b) High-magnification image of Nordox material shows appearance of highly crystalline structure (see inset; HRTEM-SAED pattern showing bright spots confirming crystallinity). Field Emission Scanning Electron Microscopy (FE-SEM) images of the material are shown in image (c) and (d).

FIGS. 4A through 4E illustrate phytotoxicity results of various coatings. In particular, FIG. 4 illustrates a phytotoxicity assessment of: (a) uncoated (b) surface coated ZnO, (c) surface coated VE-ZnO, (d) Nordox, and (e) Kocide 3000 materials. Formulations were applied at spray rate of 790 ppm metallic Zn. Digital photographs showing no plant tissue damage (−) occurred even after 72 hours.

Figure 5:
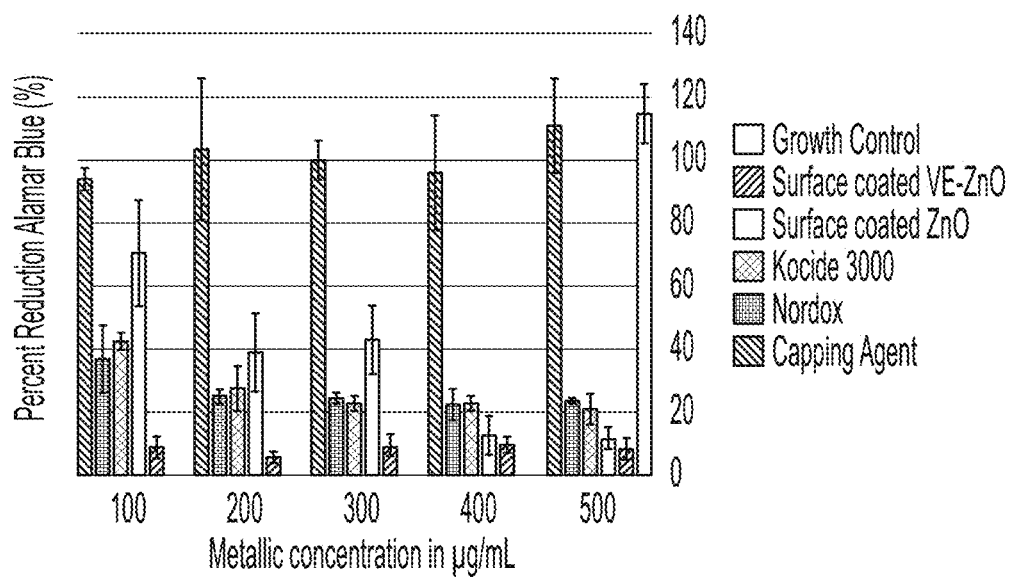
FIG. 5 illustrates the growth inhibition with Alamar blue Assay of *E. coli* against VE-ZnO, coated ZnO, Nordox, and Kocide 3000.

FIG. 5 illustrates the growth inhibition with Alamar blue Assay of *E. coli* against VE-ZnO, coated ZnO, Nordox, and Kocide 3000.

Figure 6:
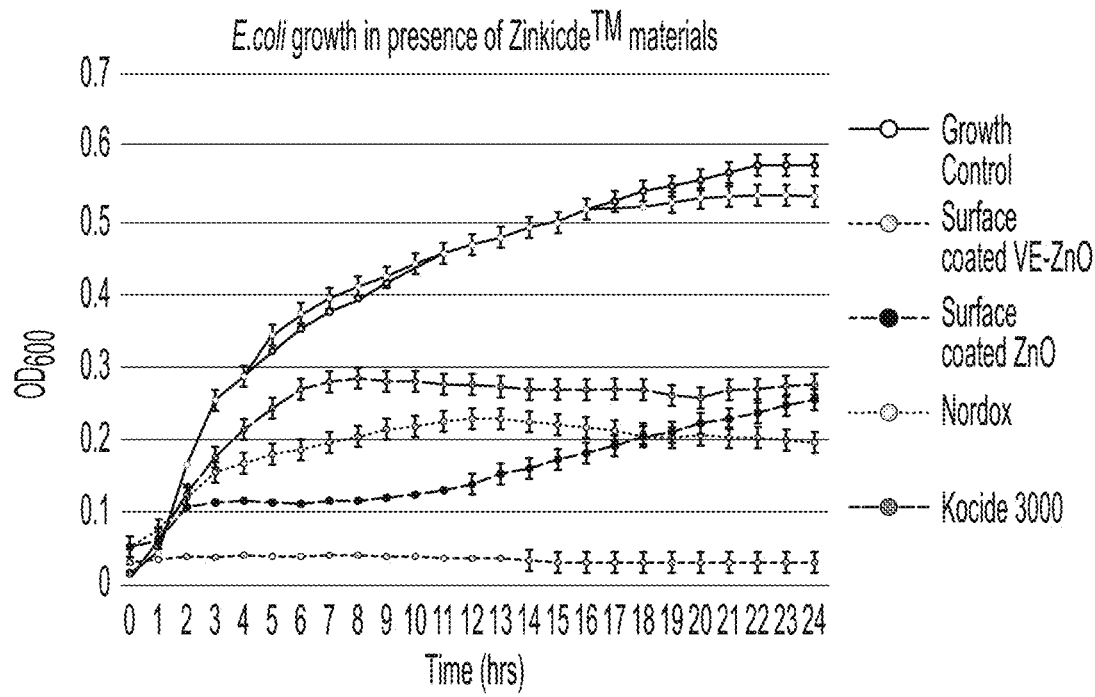
FIG. 6 illustrates *E. coli* growth curves in presence of Zinkicide™ against VE-ZnO, coated ZnO, Nordox, and Kocide 3000.

FIG. 6 illustrates *E. coli* growth curves in presence of Zinkicide™ of *E. coli* against VE-ZnO, coated ZnO, Nordox, and Kocide 3000.

Figure 7:
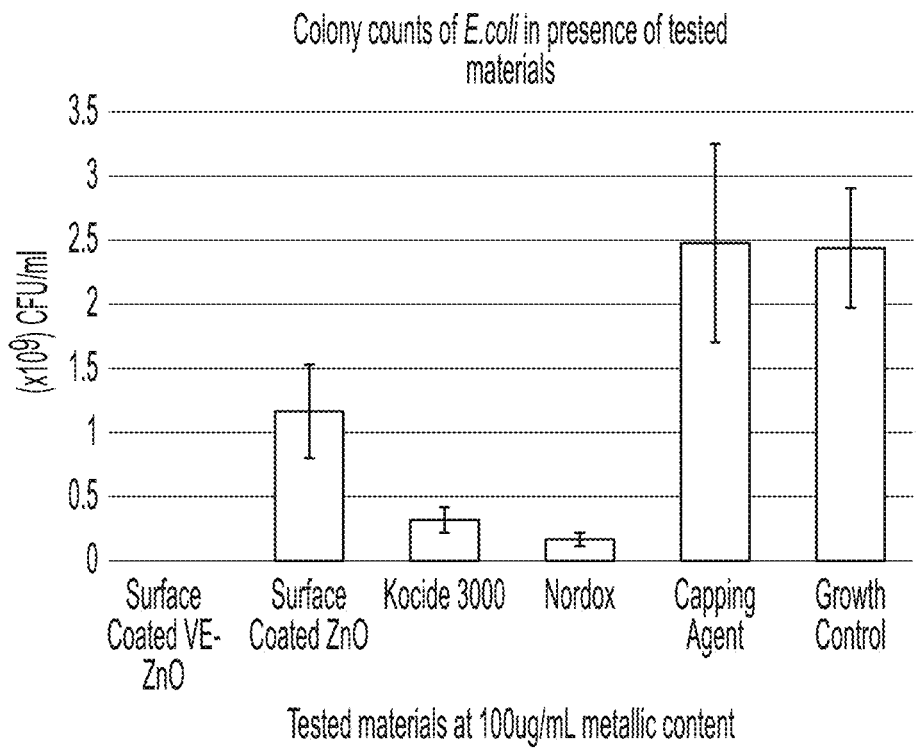
FIG. 7 illustrates *E. coli* viability in presence of Zinkicide™ materials.

FIG. 7 illustrates *E. coli* viability in presence of Zinkicide™ materials. In particular, FIG. 7 illustrates viability of *E. coli* against VE-ZnO, coated ZnO, Nordox and Kocide 3000.

Figure 8:
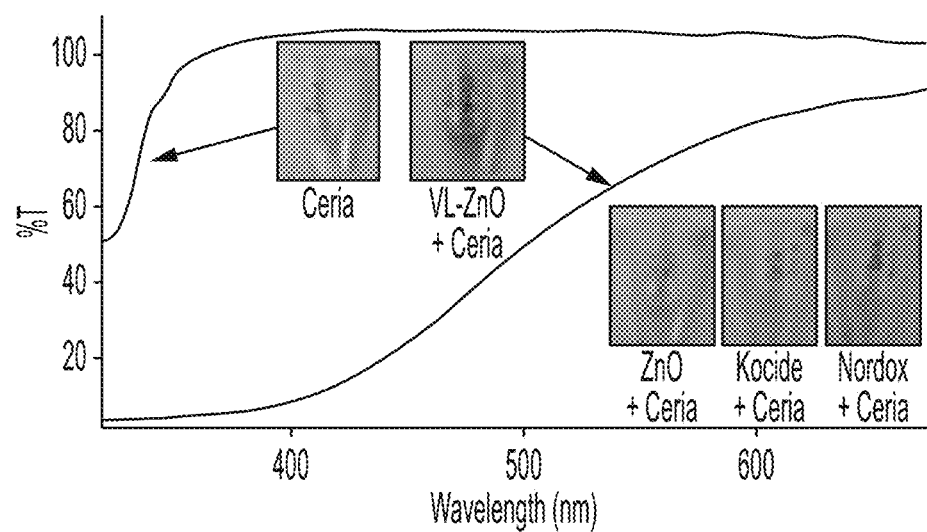
FIG. 8 illustrates direct evidence of reactive oxygen species (ROS) generation by the coated VE-ZnO material.

FIG. 8 illustrates direct evidence of ROS generation by the coated VE-ZnO material. FIG. 8 illustrates transmission spectra of mixed-valence ceria and ceria treated with surface coated VE-ZnO material. Ceria and VE-ZnO are whitish in color. However, when combined together an intense red color develops. A clear shift of ceria transmission wavelength towards longer wavelength was observed, confirming conversion of $Ce^{3+}$ to $Ce^{4+}$ state upon reaction with ROS (produced by the surface coated VE-ZnO material).

FIGS. 9A and 9B illustrate HRTEM—EDX spectra of surface coated VE-ZnO and ZnO. FIG. 9 illustrates a representative HRTEM-EDX spectra of surface coated A VE-ZnO and B surface coated ZnO materials. Characteristic elemental peaks of Zn and oxygen were found in the spectra. Au peak is originated from the HRTEM Au grid substrate.

FIGS. 10A and 10B illustrate x-ray photoelectron spectroscopy (XPS) results of surface coated VE-ZnO and ZnO. In particular, FIG. 10 illustrates XPS results of surface coated: (a) VE-ZnO and (b) surface coated ZnO materials. Characteristic peak of Zn (II) oxidation state was observed.

FIG. 11 illustrates a schematic representation of VE ZnO ("Zinkicide") nanoparticle composite (nanocomposite).

Figure 12:
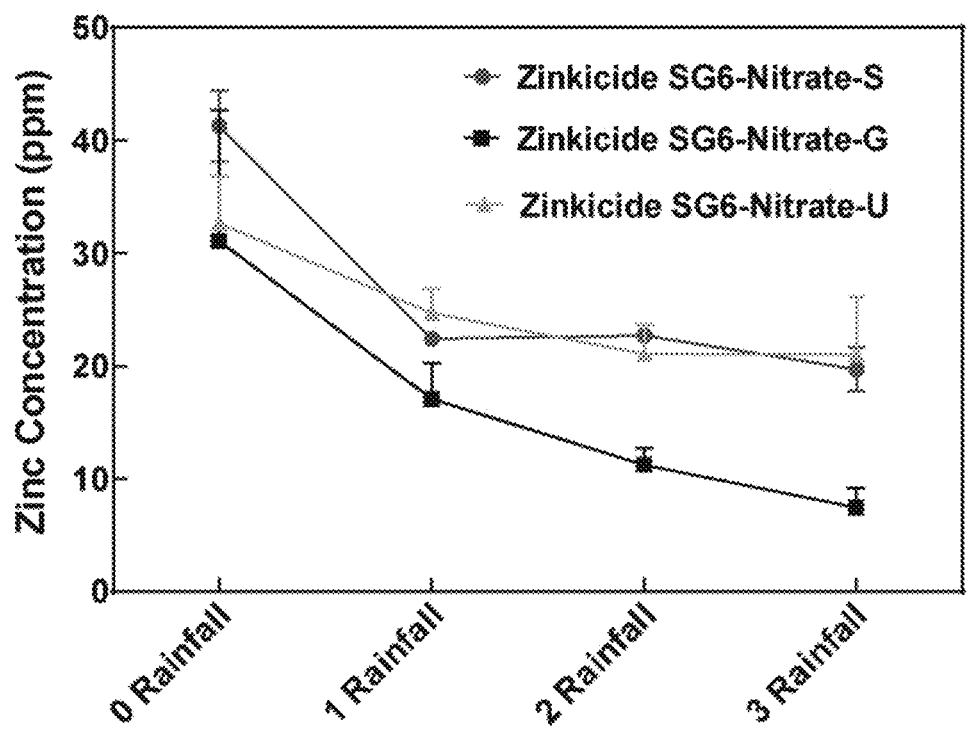
FIG. 12 illustrates rainfastness data of VE-ZnO nanoparticle composites.

FIG. 12 illustrates Zinkicide™ leaf washoff properties.

Figures 13, 14A:
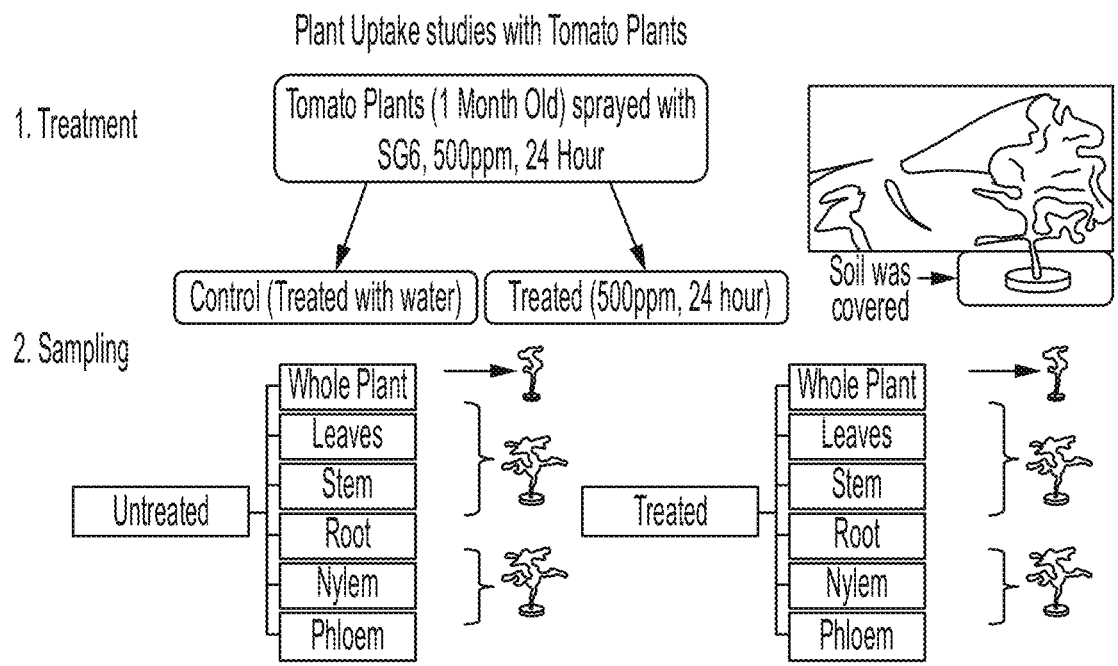

FIG. 13 illustrates Zinkicide™ properties relative to snow pea seed germination.

FIG. 14A, FIG. 14B and FIG. 14C illustrate experimental methodology and results of measuring uptake of Zinkicide™ into tomato plants.

Figure 15:
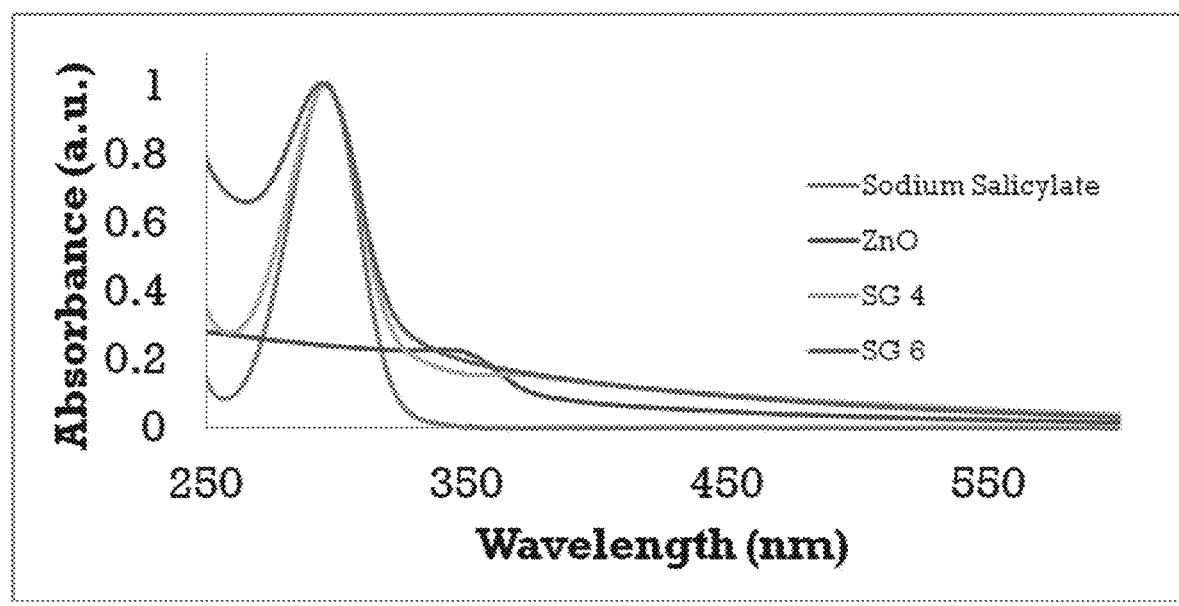
FIG. 15 illustrate UV-visible absorbance spectra for VE-ZnO nanoparticle composite, where the intersection points with the vertical axis from low to high absorbance correspond with sodium salicylate, ZnO, Zinkicide SG4 and Zinkicide SG6.

FIG. 15 shows UV-visible optical spectra characteristics of a Zinkicide™ material in accordance with the embodiments.

FIGS. 16A and 16B shows a fluorescence emission spectrum of Zinkicide materials in accordance with the embodiments.

Figure 17A:
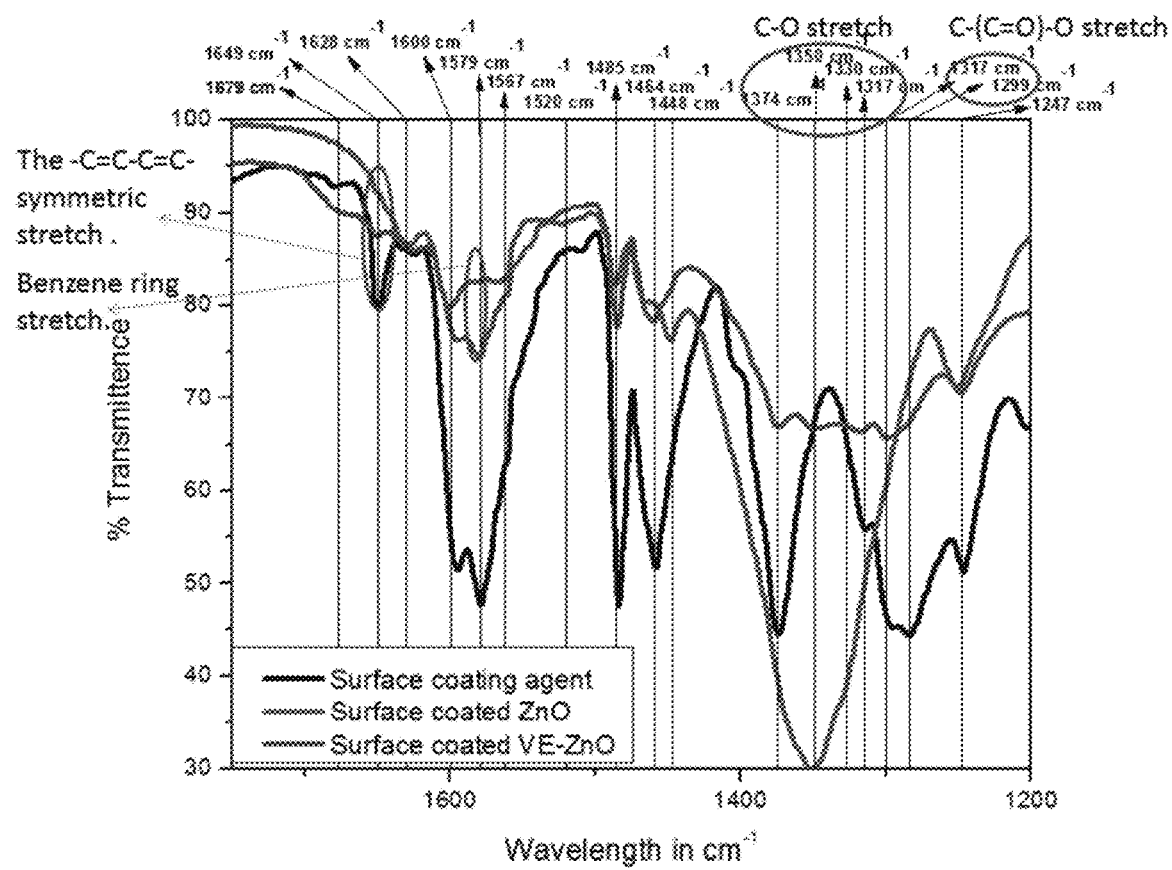
FIGS. 17A and 17B illustrate FT-IR spectra of surface coated ZnO, surface coated VE-ZnO and the surface coating agent. FTIR results show that the surface coating agent is present in both ZnO and VE-ZnO materials.
Figure 17B:
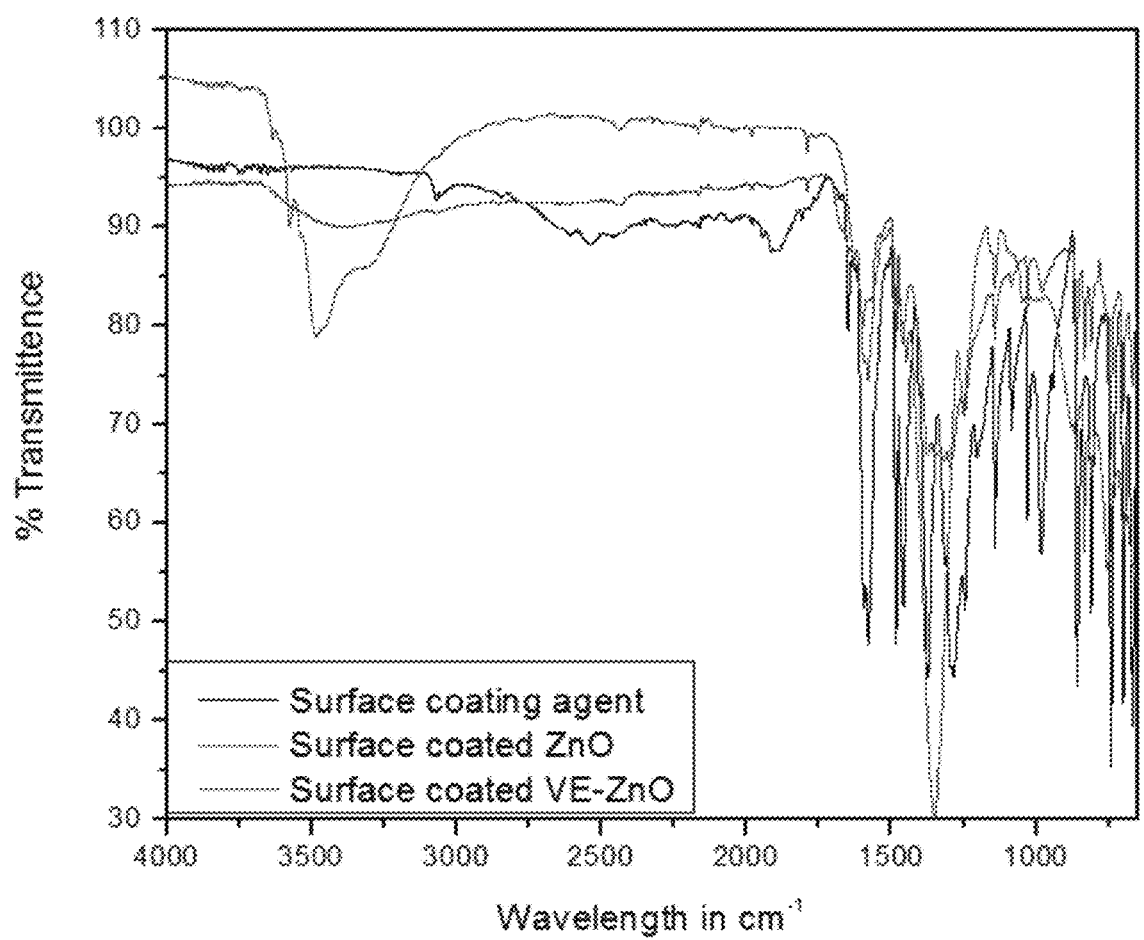

FIGS. 17A and 17B illustrate FT-IR spectra of surface coated ZnO, surface coated VE-ZnO and the surface coating agent. FTIR results show that the coating agent is present in both ZnO and VE-ZnO materials. In FIG. 17A, the curve that corresponds with the peak at 1600 cm-1 corresponds with the surface coating agent. The curve that corresponds with the peak at 1350 cm-1 corresponds with surface coated ZnO and the remaining curve which does not include a deep peak corresponds with surface coated VE-ZnO. In FIG. 17B, the curve that corresponds with the peak at 3500 cm-1 corresponds with the surface coated VE-ZnO, the curve that corresponds with that peak at 2000 corresponds with surface coating agent and the remaining curve corresponds with the surface coated VE-ZnO.

Figure 18:
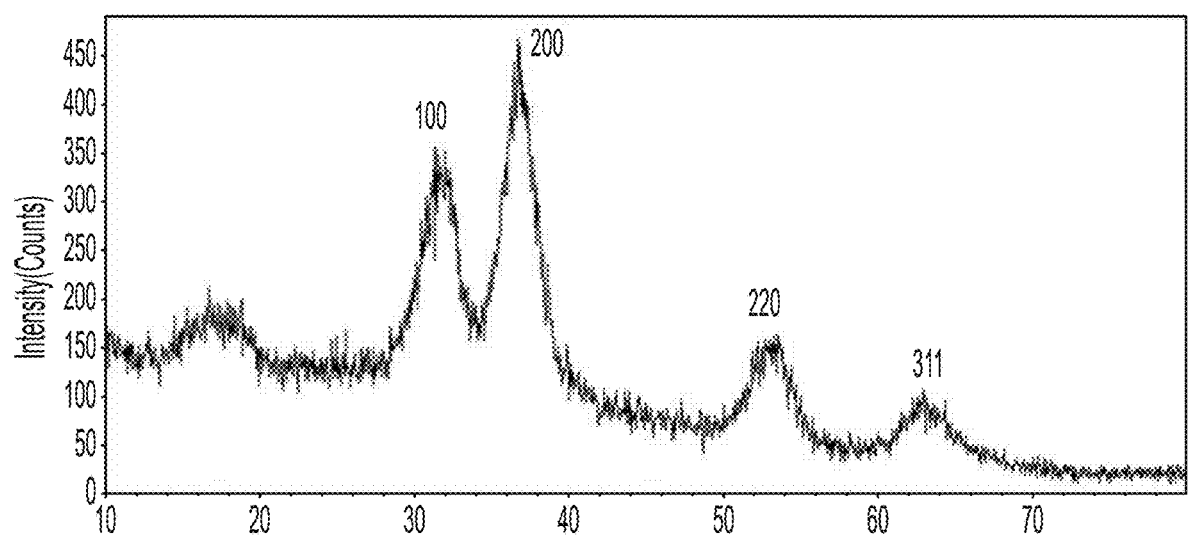
FIG. 18 illustrates an XRD of surface coated VE-ZnO. XRD pattern revealing 200 (strong), 220 and 311 reflection peaks VE-ZnO at 2θ value of ~36°, 54° and 64° were observed. These peaks are characteristic to ZnO material with oxygen vacancy. The appearance of XRD peak at 2θ value of ~17° has not been assigned yet (possibly originating from the surface coating agent).

FIG. 18 illustrates an XRD of surface coated VE-ZnO. XRD pattern revealing 200 (strong), 220 and 311 reflection peaks VE-ZnO at 2 θ value of ~36°, 54° and 64° were observed. These peaks are characteristic to ZnO material with oxygen vacancy. The appearance of XRD peak at 2θ value of ~17° has not been assigned yet (possibly originating from the surface coating agent).

Figure 19A:
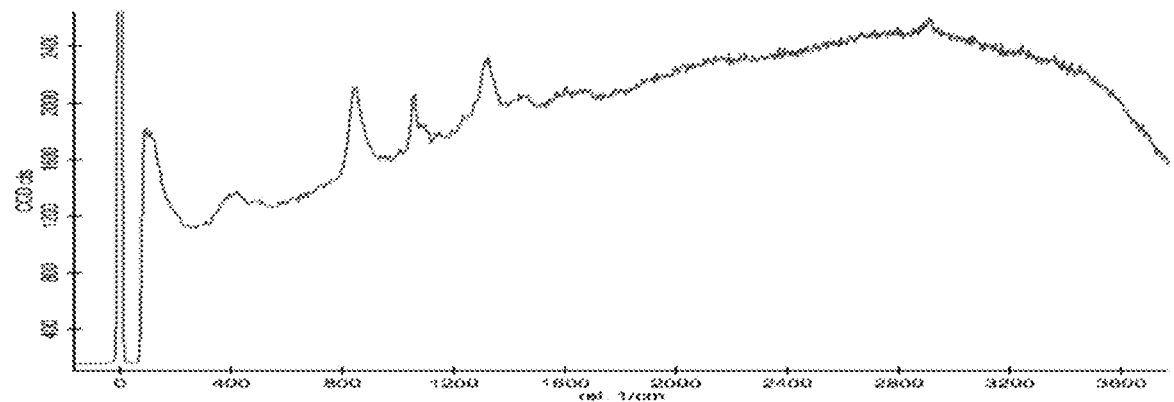
FIGS. 19A and 19B illustrate Raman spectra of (a) surface coated VE-ZnO and (b) surface coated ZnO materials. Appearance of strong ~840 $cm^{-1}$ Raman peak is characteristic to VE-ZnO O—O stretching vibration of peroxide (an active ROS). No such peak is present in surface coated ZnO material.
Figure 19B:
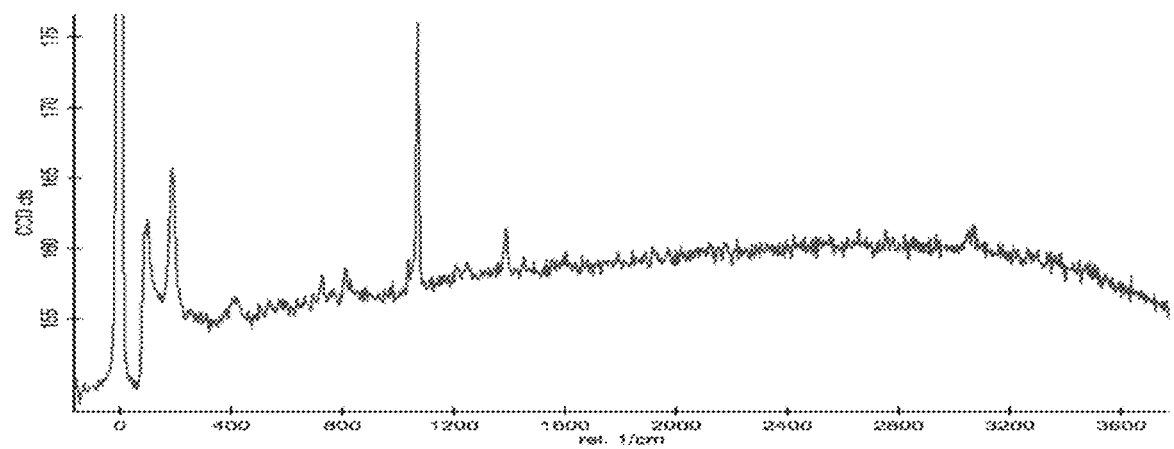

FIGS. 19A and 19B illustrate Raman spectra of (a) surface coated VE-ZnO and (b) surface coated ZnO materials. Appearance of strong ~840 cm$^{-1}$ Raman peak is characteristic to VE-ZnO O—O stretching vibration of peroxide (an active ROS). No such peak is present in surface coated ZnO material.

Figure 20A:
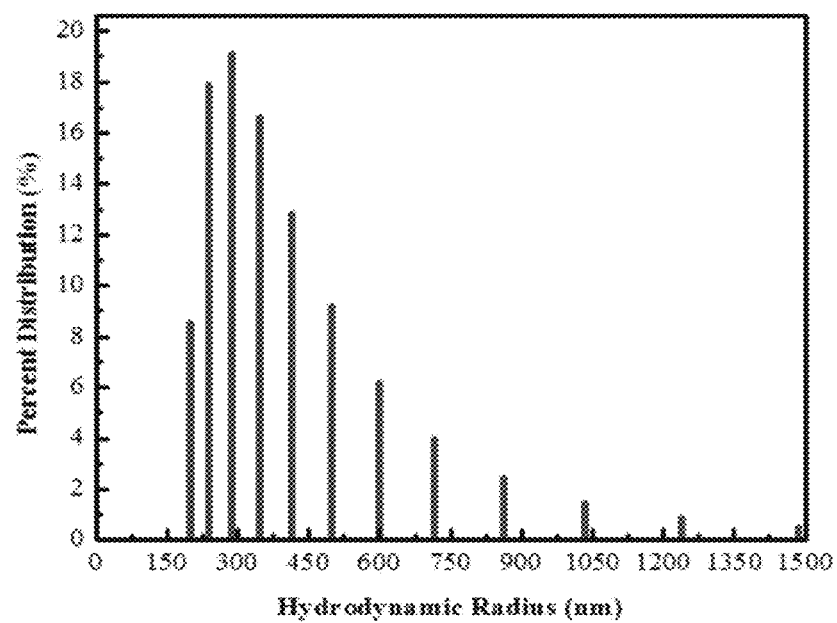
FIGS. 20A and 20B illustrate DLS particle size distribution of (a) surface coated ZnO and (b) surface coated VE-ZnO materials. Narrow particle size distribution of VE-ZnO material is indicative of smaller and uniform-size cluster formation.
Figure 20B:
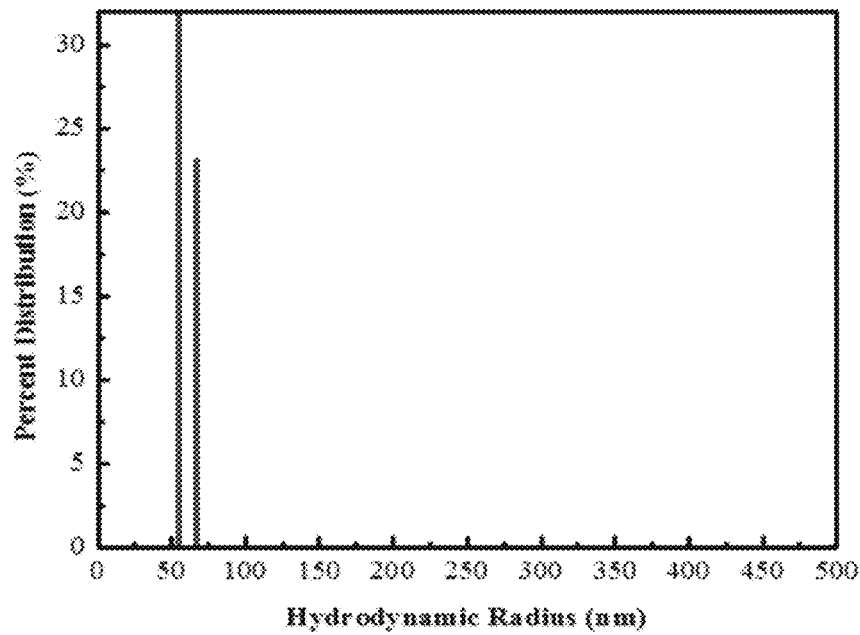

FIGS. 20A and 20B illustrate DLS particle size distribution of (a) surface coated ZnO and (b) surface coated VE-ZnO materials. Narrow particle size distribution of VE-ZnO material is indicative of smaller and uniform-size cluster formation Table 1 illustrates the minimum inhibitory concentration against *E. coli* for various agents.

TABLE 1

MIC of surface coated VE-ZnO, coated ZnO, surface capping agent, Kocide 3000, and Nordox against *E. coli*

| Tested Material | MIC (µg/mL) in metallic Zn or Cu |
|---|---|
| Surface coated ZnO | 750 |
| Surface coated VE-ZnO | 93.75 |
| Capping Agent | 3000 |
| Kocide 3000 | 1000 |
| Nordox | 750 |

Example 2

Materials/Methods:

This example describes the testing of various applications and effectiveness of two formulations of the VE-ZnO nanocomposites of the present disclosure. The formulations correspond to the particle formulations described in Example 1 above as follows:

Zinkicide™ SG4 corresponds to ZSAL-SG-2 in Example 1, above

Zinkicide™ SG6 corresponds to ZPSAL-SG-6 in Example 1, above.

More specifically, in the present example, SG4 (3.14 gallon preparation) is prepared as follows (2 hr preparation time):
1. DI water—3.75 L
2. Zinc nitrate hexahydrate solution—1.25 L (59 wt % solution in DI water)
3. Sodium hydroxide—6.25 L (1M solution)
4. Sodium salicylate—625 mL (32.8 wt % solution in DI water)

In the present example, Zinkicide SG6 (3.14 gallon preparation) is prepared as follows:
1. DI water—1.25 L
2. Hydrogen peroxide (30% solution as supplied; 2.5 L)
3. Sodium salicylate—625 mL (32.8 wt % solution in DI water)
4. Zinc nitrate hexahydrate—1.25 L (59 wt % solution in DI water)
5. Sodium hydroxide—6.25 L (1M solution)
6. pH then further adjusted to 7.5 by adding 115 mL of 5M NaOH solution
7. Although not discussed in detail the ZnO formulations of this Example are the VE-ZnO particles described in detail in the application, above. This formulation as well as the size and shape of the particles and other features of the novel VE-ZnO formulations of the present disclosure distinguish these formulations from ZnO components of other products, such as the Nordox® 30/30 used as a comparison in this Example.

Discussion:

In the present example, the SG4 and SG6 formulations both outperformed prior art Nordox formulations that contain copper oxide/zinc oxide in combination. The formulations of the present disclosure do not contain copper, which reduces potential copper soil build up as well as other problems such as copper toxicity. In the attached example the SG4 and SG6 applied as a spray to plant surfaces (stems, leaves, fruits, etc.) outperformed the comparison products and control. Additional experiments were conducted where SG6 was applied systemically by soil drench (to allow systemic uptake by the plant vascular system). In these trials, the SG6 formulation was shown to have systemic uptake and effect, demonstrating that the VE-ZnO formulations of the present disclosure can have systemic as well as surface effectivity, and can be applied to surfaces (e.g., spray, powder, etc.) or to soil or other plant growth substrate/medium (e.g., hydroponic or other growth conditions where soil is not used as the growth substrate) to be taken up by plant roots and/or plant vascular system for systemic action. Applied in this manner "drench" application, the SG6 formulations outperformed both traditional protective coating formulations (such as copper, e.g., Nordox®) and other fully or locally systemic formulations (e.g., Firewall™). Thus the Ve-ZnO formulations of the present disclosure offer additional benefits in that they can provide protection and antimicrobial efficacy both as a protective coating application as well as a systemic protection (either through absorbance through leaf stromata or uptake via plant vascular system).

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to measurement techniques and the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

Example 3

Rainfastness of Zinkicide
Sour Orange root stock plants (N=3)
Materials tested were Zinkicide SG6—S, G and U versions—Zn Nitrate based
Applications were made using a pressurized sprayed bottle (Home Depot) at 800 ppm metallic Zn (similar to application rate in Citrus Canker Trial) until plants were fully covered and dripping.
After spraying, plants were allowed to air dry for 24 hrs before starting simulated rainfall.
Used 80 gallon/hr fountain pump to stimulate rainfall from a PVC tube with holes.
Dispensed ~4 gallons of water during each rainfall for each group of plants.
Rainfalls were 24 hrs apart to allow plants to dry.
After final rainfall and allowing drying, ~2.0 g of leaves were removed from different heights and angles of the plant.
Leaves were placed in a 50 mL conical tube and rotated at 15 rpm for 1 hr with 30 mL of 1% HCL.
After rotation, solution was filtered using Whatman filter paper and filtrate was analyzed for Zn with Atomic Absorption Spectroscopy (AAS).
Untreated controls were analyzed and showed Zn concentration below the detection limit (0.8 ppm).
Results are shown in FIG. 12 which illustrates substantial Zinkicide wash off.

Example 4

Seed Germination and Seedling Growth
Germination test monitored over 5 days
Concentration used: 50, 100, 250 and 500 ppm metallic Zn
Materials tested:
Zinkicide SG-6 (Original)
Zinkicide SG-4 (Zinkicide with no oxidizing agent)
Zinkicide SG-6 (No capping agent)
Zinkicide SG-4 (No capping agent)
Zinc Peroxide (Sigma-Aldrich)
Urea Hydrogen Peroxide Mixture
Results of Example 4 seed germination and seedling growth are found within the chart of FIG. 13. In turn the chart of FIG. 13 shows in general that a germination percentage of a snow pea seed may be decreased when treating the snow pea seed with a Zinkicide material.

Example 5

Uptake of Zinkicide in Tomato Plants
FIG. 14A, FIG. 14B and FIG. 14C show experimental methodology and results of measuring uptake of Zinkicide into tomato plants.

What is claimed:
1. A method, comprising:
applying a composition to a plant enabling entry of the composition via at least one of roots, vascular system and leaf stroma of the plant;

transporting the composition through a vascular system and on a surface of the plant, wherein the composition has comprises a vacancy-engineered (VE)-ZnO nanocomposite including a plurality of interconnected VE-ZnO nanoparticles, wherein the plurality of interconnected VE-ZnO nanoparticles has a plurality of surface defects associated with an oxygen vacancy, wherein the VE-ZnO nanoparticles have a plate-like structure and wherein each of the VE-ZnO nanoparticles has a diameter of other than about 3 to about 8 nanometers; and killing a substantial portion of a microorganism or inhibiting or substantially inhibiting the growth of the microorganism on the surface or within the plant, wherein the composition is non-phytotoxic to the plant.

2. The method of claim 1, wherein the microorganism is a bacterium.
3. The method of claim 1, wherein the microorganism selected from the group consisting of *E. coli, B. subtilis, Xanthomonas sp, Candidatus Liberibacter spp*, and *S. aureus*.

4. The method of claim 1, wherein applying includes application of the composition to a growth substrate in which the plant is growing.

5. The method of claim 4, wherein the growth substrate is soil surrounding the plant.

6. The method of claim 1, wherein applying includes forming a film of the composition on the surfaces of the plant.

7. The method of claim 6, wherein the film forms a substantially uniform plant surface coverage.

8. The method of claim 1, wherein applying includes disposing the composition on the surface of the plant.

9. The method of claim 1, wherein applying includes injecting a part of the plant with the composition in a fluid.

10. The method of claim 9,. wherein the part of the plant is a stem.

* * * * *